(12) United States Patent  
Broekhuijsen

(10) Patent No.: US 8,982,129 B1  
(45) Date of Patent: Mar. 17, 2015

(54) MAPPING GRAPH DATA TO A TREE STRUCTURE ON A COMPUTING DEVICE

(75) Inventor: Jerome Broekhuijsen, Highland, UT (US)

(73) Assignee: Crimson Corporation, Dover, DE (US)

( * ) Notice: Subject to any disclaimer, the term of this patent is extended or adjusted under 35 U.S.C. 154(b) by 960 days.

(21) Appl. No.: 12/982,517

(22) Filed: Dec. 30, 2010

Related U.S. Application Data

(60) Provisional application No. 61/327,551, filed on Apr. 23, 2010.

(51) Int. Cl.  
*G06T 11/20* (2006.01)

(52) U.S. Cl.  
USPC .......................................... 345/440; 707/736

(58) Field of Classification Search  
CPC ..... G06T 11/206; G06T 11/20; G06F 3/0481; G06F 17/246; G06F 7/00; G06F 17/30; H04L 41/22  
See application file for complete search history.

(56) References Cited

U.S. PATENT DOCUMENTS

| | | | |
|---|---|---|---|
| 7,139,973 B1* | 11/2006 | Kirkwood et al. | 715/206 |
| 2007/0174254 A1* | 7/2007 | Toong et al. | 707/3 |
| 2007/0266050 A1* | 11/2007 | Kaandorp | 707/200 |
| 2009/0327879 A1* | 12/2009 | Ferragut et al. | 715/256 |
| 2010/0082704 A1* | 4/2010 | Zhou et al. | 707/803 |
| 2012/0029939 A1* | 2/2012 | Danielson et al. | 705/3 |

OTHER PUBLICATIONS

Shevtsov et al "Highly Parallel Fast KD-tree Construction for Interactive Ray Tracing of Dynamic Scenes" Eurographics 2007; vol. 26 (Oct. 2007).*

* cited by examiner

*Primary Examiner* — Mark Zimmerman  
*Assistant Examiner* — Michelle Chin  
(74) *Attorney, Agent, or Firm* — Austin Rapp & Hardman

(57) ABSTRACT

A computing device configured for mapping graph data into a tree structure is described. The computing device includes a processor and instructions stored in memory. The computing device obtains graph data. The computing device also maps the graph data into a tree structure. The computing device further applies the tree structure to a user interface. The computing device additionally displays the user interface and performs an operation using the tree structure.

15 Claims, 12 Drawing Sheets

MAPPING GRAPH DATA TO A TREE STRUCTURE ON A COMPUTING DEVICE

RELATED APPLICATIONS

This application is related to and claims priority from U.S. Provisional Patent Application Ser. No. 61/327,551, filed Apr. 23, 2010, for "MAPPING ATTRIBUTES INTO NODES OF A TREE-LIKE STRUCTURE," with inventor Jerome Broekhuijsen, which is incorporated herein by reference.

TECHNICAL FIELD

The present disclosure relates generally to computers and computer-related technology. More specifically, the present disclosure relates to mapping graph data to a tree structure on a computing device.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user.

One of the challenges involved with computer technologies is making computer functionality and/or data easily accessible to users. In some cases, however, functionality and/or data may not be directly presentable in a way that is easily accessible to many users. As can be observed from this discussion, systems and methods that improve user accessibility to computer functionality and/or data may be beneficial.

DETAILED DESCRIPTION

Figure 1:
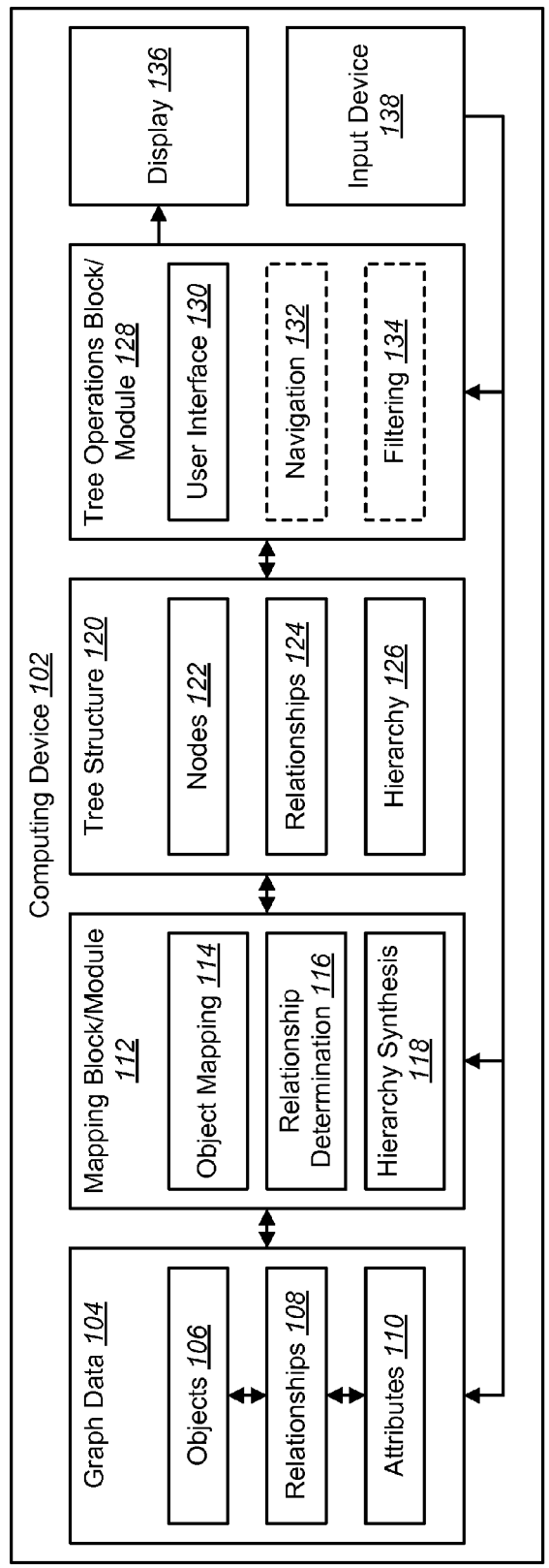
FIG. 1 is a block diagram illustrating one configuration of a computing device in which systems and methods for mapping graph data to a tree structure may be implemented.

A computing device configured for mapping graph data into a tree structure is disclosed. The computing device includes a processor and executable instructions stored in memory that is in electronic communication with the processor. The computing device obtains graph data. The computing device also maps the graph data into a tree structure. The computing device additionally applies the tree structure to a user interface. Furthermore, the computing device displays the user interface. The computing device also performs an operation using the tree structure.

Mapping the graph data to a tree structure may include determining a hierarchy and generating nodes based on one or more objects and one or more attributes. Mapping the graph data to a tree structure may also include generating a node relationship based on the hierarchy and a relationship between at least one object and at least one attribute to create a tree structure. Determining a hierarchy may be based on tiered categories. The computing device may also obtain one or more custom attributes. Relationships in the graph data may be transitive.

Performing the operation using the tree structure may include navigating the tree structure. Performing the operation using the tree structure may include filtering using the tree structure.

An object in the graph data may be mapped to one or more leaf nodes in the tree structure. An object or an attribute in the graph data may be mapped to one or more nodes in the tree structure.

A method for mapping graph data into a tree structure is also disclosed. The method includes obtaining graph data. The method also includes mapping, on a computing device, the graph data into a tree structure. The method additionally includes applying, on the computing device, the tree structure to a user interface. Furthermore, the method includes displaying the user interface. The method also includes performing an operation using the tree structure.

A non-transitory, tangible computer-readable medium for mapping graph data into a tree structure is also disclosed. The computer-readable medium includes executable instructions for obtaining graph data and mapping the graph data into a tree structure. The computer-readable medium also includes executable instructions for applying the tree structure to a user interface. Executable instructions for displaying the user interface are also included on the computer-readable medium. The computer-readable medium also includes executable instructions for performing an operation using the tree structure.

The systems and methods disclosed herein may be used for mapping attributes and objects into nodes of a tree-like structure. The relationships of objects to attributes (or properties such as set membership) may be mapped to a graph. In this graph, objects and attributes may comprise the graph's nodes (e.g., vertices). Relationships between such objects and attributes may be represented by links (e.g., edges). Although a graph may be a reasonable topological mechanism for storing and representing such relationships, it may be a poor representation for users to navigate. There are relatively few common tools or user interface widgets that facilitate the navigation of graph data. Thus, most users are unfamiliar with navigating graphs. The systems and methods disclosed herein may use tree-like structures to represent the relationships present in a graph. In other words, objects, attributes and relationships in a graph may be mapped to a tree-like structure. This may present these relationships in a way that applies to a wide range of tree-navigation user interfaces (e.g., user interface controls, widgets, etc.). Furthermore, the tree-like structures may be easily navigated by human users.

In the tree-like structure, objects may appear as "leaves" of the tree (e.g., nodes that have no "children"). Furthermore, relationships are transitive. That is, a node has a relationship to another node if there is a path (e.g., strictly upward or downward) from one node to the other node. A synthesized hierarchy of nodes may be used. For example, the linearized sequence (e.g., chain) of attributes may not be unique. There may be many possible orderings of the attributes (each ordering may be tuned to meet different needs). A single node in the generalized graph may be represented multiple times in the tree.

While some nodes may be repeated in different branches of the tree, it may not always be the case that every internal node is repeated across every branch. In this way, the structure of the tree may be driven partially in a bottom-up fashion, where the attributes of an object determine which nodes appear in its list of progenitors.

One configuration of the systems and methods disclosed herein involves creating a tree-like structure representing a filter. This may allow a user to navigate through the tree to any particular node (not necessarily a leaf node), filtering a data set to a desired size and quality. For example, an "All Products" root to the tree may be created. "Product Super Groups" of "Discovered", "Monitored", and "Ignored" may also be created. These Product Super Groups may be set-membership (e.g., state) attributes of the Products. Under Product Super Groups may be Product Groups of two kinds: Automatic Product Groups that are created automatically to correspond to a Manufacturer attribute of a product and Custom Product Groups that are created by the user to represent set membership according to arbitrary user preferences. Beneath Product Groups are Products. With this particular ordering, the user is able to focus on Monitored products, and then pay attention to those Products from specific Manufacturers (e.g., Adobe, Microsoft, etc.) and then (as needed) pay more particular attention to specific Products (e.g., Office, Photoshop, etc.). This structure may serve as a filter on Product usage data.

The systems and methods disclosed herein may also be applied to other data relationships that can be mapped to graphs, such as facets and tags. Thus, the systems and methods disclosed herein provide a way to construct a hierarchical filter/navigator using graph-based data (e.g., objects along with their attributes, properties, set-memberships, tags, facets, etc.) for navigating and filtering large quantities of data.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a computing device 102 in which systems and methods for mapping graph data 104 to a tree structure 120 may be implemented. The computing device 102 may include graph data 104, a mapping block/module 112, a tree structure 120, a tree operations block/module 128, a display 136 and/or an input device 138. Examples of the computing device 102 include desktop computers, laptop computers, servers, supercomputers, tablet devices, cellular phones, smartphones, gaming systems and any other computing device. As used herein, a "block/module" may be implemented in hardware, software or a combination of both.

The graph data 104 may be data that is structured according to a graph. For example, the graph data 104 may include (data representing) one or more objects 106, one or more attributes 110 and/or one or more relationships 108. In one configuration, the objects 106, attributes 110 and/or relationships 108 may be represented as bits of data in memory on the computing device 102. For example, graph data 104 may comprise strings of bits that represent data, memory addresses and/or pointers. In one configuration, the graph data 104 may be stored in a database. An object 106 may be data representing an entity. For example, an object 106 may be data that represents software, hardware, a computer, etc. An attribute 110 may be an attribute of an object 106. Examples of attributes 110 include manufacturers, states (e.g., monitored, ignored, allowed, blocked, etc.), compatible operating systems, groups, vendors, etc. A relationship 108 may relate objects 106 to each other, attributes 110 to each other and/or one or more objects 106 to one or more attributes 110. For example, an iTunes object 106 (representing iTunes software, for example) may be related to a Windows attribute using a relationship 108 and to an OS X attribute using a relationship 108 (indicating that iTunes may run on a Windows operating system or an Apple OS X operating system, for example). Graph data 104 may be stored on the computing device 102 and/or received from some external source, such as a network, from the input device 138 (e.g., from a user) and/or from an external drive, etc.

The mapping block/module 112 may used to map graph data 104 to a tree structure 120. The mapping block/module 112 may be implemented in hardware, software or a combination of both. The mapping block/module 112 may include an object mapping block/module 114, a relationship determination block/module 116 and/or a hierarchy synthesis block/module 118. For example, the mapping block/module 112 may generate one or more nodes 122, one or more relationships 124 and/or a hierarchy 126 in order to generate the tree structure 120 and/or map graph data 104 to the tree structure 120. In one configuration, the mapping block/module 112 generates a root node 122 for the tree structure that is related to other nodes 122.

The object mapping block/module 114 may map one or more objects 106 to one or more nodes 122 (in the tree structure 120). For example, each of the objects 106 may be mapped to one or more "leaf" nodes 122 in the tree structure 120. A "leaf" node 122 may be a node 122 that has no "child" nodes 122 and one or no parent node 122. For example, an iTunes leaf node 122 may have an Apple parent node 122 related to it and no child nodes 122.

The relationship determination block/module 116 may determine and/or generate relationships 124 in the tree structure 120 based on graph data 104 relationships 108. For example, the relationship determination block/module 116 may map a graph data 104 relationship 108 to one or more tree structure 120 relationships 124. The tree structure 120 relationships 124 may be transitive. For example, one node 122 is related to another node 122 (according to graph data relationships 108, for example) if there is a path (e.g., strictly upward or downward) between the nodes 122.

The hierarchy synthesis block/module 118 may be used to synthesize or generate a hierarchy 126 for the tree structure 120. For example, the tree structure 120 may include a hierarchy 126 that determines a sequence or ordering of the nodes 122. For example, the one or more objects 106 may be mapped to leaf nodes 122 as discussed above. However, the sequence or chain followed by the other nodes 122 (mapped from attributes 110, for example) may be determined based on the hierarchy 126. This is because the hierarchy 126 may not be unique. Different orderings or sequences in a hierarchy 126 may be used. The hierarchy synthesis block/module 118 may follow a pre-set ordering, may determine a hierarchy 126 using a particular algorithm and/or may determine a hierarchy 126 based on an input. For example, a user of the computing device 102 may prefer to have the nodes 122 ordered in some particular way. The computing device 102 may receive an input (that indicates an ordering, for example) from the input device 138. The hierarchy synthesis block/module 118 may then synthesize or generate the hierarchy 126 accordingly.

Thus, the mapping block/module 112 may generate (e.g., map objects 106, relationships 108 and/or attributes 110 to) the tree structure 120. The tree structure 120 may include nodes 122, relationships 124 and/or a hierarchy 126. The nodes 122 may be data that represent the graph data 104 object(s) 106 and/or attribute(s) 110. For example, the tree structure 120 may arrange nodes 122 (representing objects 106 and/or attributes 110) using a root node 122 with relationships 124 and other nodes 122 that branch out from the root node 122. It should be noted that creating a "root node," while convenient in many circumstances, may not be strictly required in accordance with the systems and methods disclosed herein. Without a "root node," for example, there can be a "forest" of trees, which may be represented through a user interface (e.g., an "All Products" root node may be eliminated and a forest of two trees may be "rooted" with "Monitored" and "Ignored" nodes).

The tree structure 120 may be provided to a tree operations block/module 128. The tree operations block/module 128 may be used to perform one or more operations using the tree structure 120. For example, the tree operations block/module 128 may include a user interface 130. The user interface 130 may be presented on the display 136. The user interface 130 may be used to access and/or display tree structure 120 information. For example, the user interface 130 may allow a user to access the tree structure 120 nodes 122. In some configurations, the tree operations block/module 128 may include navigation 132 functionality and/or filtering 134 functionality.

The navigation 132 functionality may be provided through and/or by the user interface 130, for example. The user interface 130 may navigate the one or more nodes 122 of the tree structure 120. For instance, a user may input a command to the user interface 130 (using the input device 138, for example). The user interface 130 may display information based on different nodes 122 based on the command. More specifically, the user interface 130 may navigate or traverse the tree structure 120 nodes 122 using one or more relationships 124.

Additionally or alternatively, the tree operations block/module 128 may provide navigation 132 functionality independent of the user interface 130. For example, the tree operations block/module 128 may perform one or more operations (e.g., modifying data, storing data, exporting data, printing data, and/or performing other operations related to the nodes 122 (and hence, objects 106, for example), etc.) by navigating the nodes 122 using navigation 132 functionality.

The filtering 134 functionality may be provided through and/or by the user interface 130, for example. In one configuration, the user interface 130 may display filtered tree structure 120 information (e.g., a subset of nodes 122, relationships 124, etc.). For instance, the user interface 130 may display only nodes 122 that are related to a selected node 122. For example, the user interface 130 may display information about ancestor nodes 122 (e.g., parent and grandparent nodes 122, etc.) and descendant nodes 122 (e.g., child, grandchild nodes 122, etc.) of a selected node 122, while not displaying other nodes 122. In another example, the user interface 130 may display information about nodes 122 that are related to a selected node 122 within a particular number of steps. For instance, only a parent node 122 (e.g., no grandparent nodes 122) and immediate child nodes 122 (e.g., no grandchild nodes) 122 may be displayed by the user interface 130 using the filtering 134 functionality. Other operations (e.g., storing, exporting, printing, changing settings for, blocking, allowing, modifying licenses for, updating, generating commands, etc.) may be performed using a set of filtered nodes 122 using the filtering 134 functionality.

Additionally or alternatively, the tree operations block/module 128 may provide filtering 134 functionality independent of the user interface 130. For example, the tree operations block/module 128 may perform one or more operations on a filtered tree structure 120. For instance, the tree operations block/module 128 may store, export, print and/or perform other operations related to a filtered set of nodes 122 (e.g., related to the corresponding objects 106).

The display 136 may be a device used to convey visual information. Examples of displays 136 include Liquid Crystal Displays (LCDs), Active Matrix Organic Light Emitting Diode (AMOLED) displays, Cathode-Ray Tube (CRT) displays, projectors, etc. The display 136 may be used to present the user interface 130. The display 136 may also display tree structure 120 information (e.g., node 122 information, relationship 124 information, etc.).

The input device 138 may be used to receive input. Examples of input devices 138 include keyboards, mice, cameras, touchscreens, microphones, etc. For instance, a user may use an input device 138 to interact with the user interface 130. In one configuration, the user may enter a preference for the hierarchy 126 of the tree structure 120, navigation commands and/or filtering commands, for example.

Figure 2:
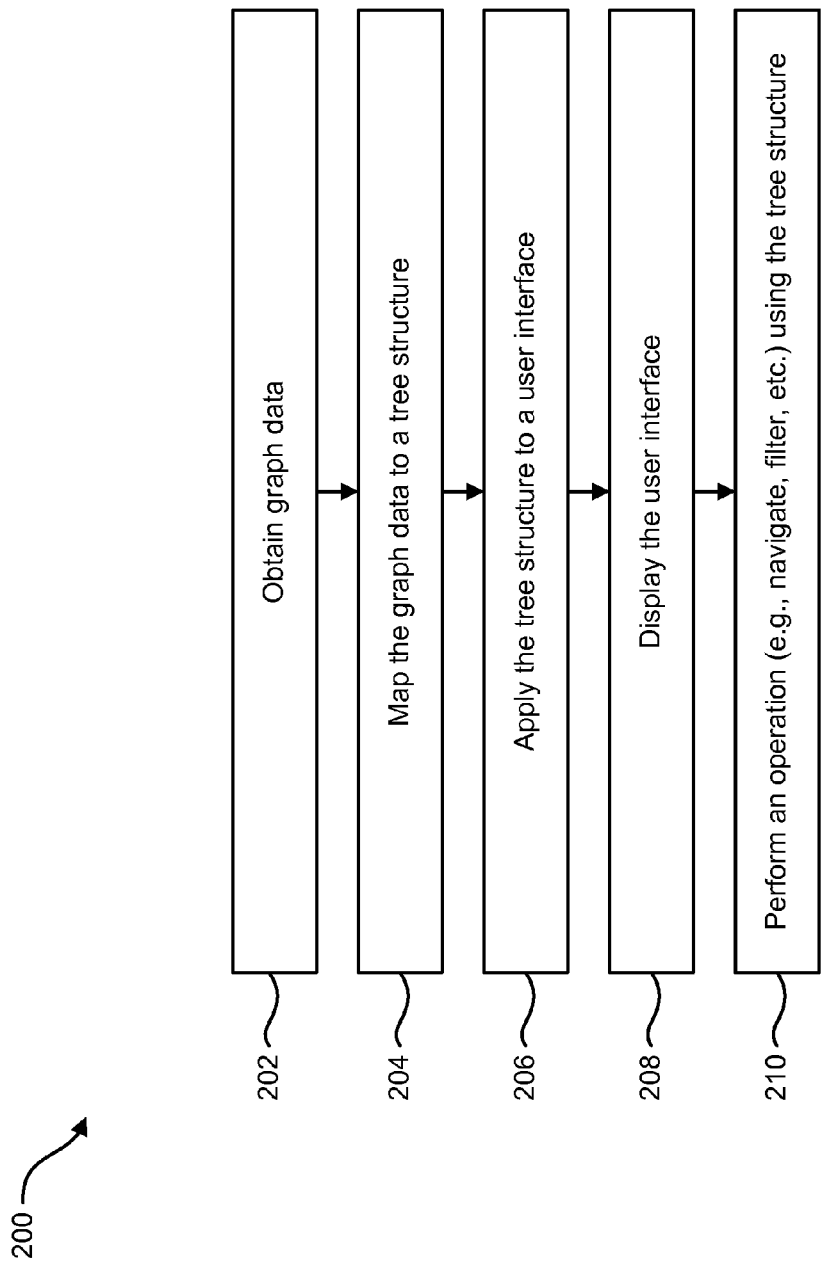
FIG. 2 is a flow diagram illustrating one configuration of a method for mapping graph data to a tree structure on a computing device.

FIG. 2 is a flow diagram illustrating one configuration of a method 200 for mapping graph data to a tree structure on a computing device. A computing device 102 may obtain 202 graph data 104. For example, the computing device 102 may obtain 202 graph data 104 from a file, user input, network communications, etc. For instance, a file containing object 106, relationship 108 and/or attribute 110 information may be received from external media and stored in computing device 102 memory. Graph data 104 may be additionally or alternatively obtained 202 over a network (e.g., Local Area Network (LAN), the Internet, etc.) of computing devices. Additionally or alternatively, the computing device 102 may receive user input including graph data 104.

The computing device 102 may map 204 the graph data 104 to a tree structure 120. For example, the computing device 102 may synthesize or generate a hierarchy 126, determine one or more node relationships 124 and map objects 106 and/or attributes 110 into nodes 122 in the tree structure 120. More specifically, the computing device 102 may determine or synthesize a hierarchy 126. This may be done using a pre-defined order, user input and/or a determination algorithm. The computing device 102 may generate tree structure 120 nodes 122 based on one or more graph data 104 objects 106 and/or attributes 110. Graph data 104 objects 106 may be mapped to "leaf" nodes 122 or nodes 122 without child nodes. One or more attributes 110 may be mapped to one or more nodes 122 in the tree structure 120. The computing device 102 may also determine node relationships 124 based on graph data 104 relationships 108 and/or the hierarchy 126. The tree structure 120 may be generated partially in a "bottom-up" fashion, where the leaf nodes 122 (based on graph data 104 objects 106, for example) are used to determine their ancestor or progenitor tree structure 120 nodes 122. The computing device 102 may also generate one or more other nodes (e.g., a root node) for the tree structure 120.

The computing device 102 may apply 206 the tree structure 120 to a user interface 130. For example, the computing device 102 may provide the tree structure 120 to a user interface 130 such that the user interface 130 may interact with the tree structure 120 and/or perform some operation based on the tree structure 120. This may allow the user interface 130 to display (a representation of) the tree structure 120 and/or its 120 nodes 122, to navigate the tree structure 120, to filter tree structure 120 information and/or perform other operations using and/or based on the tree structure 120.

The computing device 102 may display 208 the user interface 130. For example, the computing device 102 may render the user interface 130 on a display 136. This may provide a user with a visual representation of the user interface that allows the user to interact with the user interface 130. In some instances, displaying 208 the user interface 130 may also display information related to the tree structure 120. For example, information related to one or more nodes 122 and/or relationships 124 may be displayed using the user interface 130.

The computing device 102 may perform 210 an operation using the tree structure 120. For example, the computing device 102 may navigate the tree structure 120, filter tree structure 120 information and/or perform some other operation using the tree structure 120. In one configuration, the computing device 102 may receive a command from the input device 138. For example, a user may click on a (representation of a) node 122 using the user interface 130 using a mouse. The computing device 102 may then display information relating to that node 122, such as one or more ancestor nodes 122 and/or one or more descendant nodes 122. The user may then click on another node 122, which the computing device 102 may "navigate" to by displaying information regarding that node 122.

Additionally or alternatively, the computing device 102 may filter tree structure 120 information. For example, a user may click on a (representation of a) node 122 using a mouse. The computing device 102 may then display a subset of tree structure 120 nodes 122 or information. For example, the computing device 102 may display only the parent node 122 of the selected node 122 and any immediate child nodes 122 of the selected node 122. This may allow the user to view only a portion of the tree structure 120 information at a time. More detail of the portion of tree structure 120 information may be displayed. Navigation and filtering may also occur concurrently. For example, the computing device 102 may traverse the tree structure 120 nodes 122 and filter (e.g., display only a subset of) the tree structure 120 data based on user input. For instance, assume that the user interface 130 is currently displaying node A that has two child nodes, node B and node C. When the user clicks on node B, the user interface 130 stops displaying node C and displays node B's child nodes, node D and node E. In this manner, the computing device 102 may allow tree structure 120 filtering and navigation. In other words, one of the applications of the systems and methods disclosed herein involves creating a tree like structure 120 representing a filter. A user is able to navigate through the tree 120 to any particular node 122 (not necessarily a leaf node 122), filtering a data set to the desired size and quality.

The computing device 102 may additionally or alternatively perform other operations using the tree structure 120. For example, the computing device 102 may traverse the tree structure 120 and perform operations based on the nodes 122. For example, a user may desire to order a product that is a descendent node of some attribute, such as a brand or manufacturer. Initially, the user may be presented with several brands or manufacturers. Upon selecting a brand node, the user interface 130 may navigate to that brand node and display product nodes of that brand. The computing device 102 may then place an order for a product represented by the product node when clicked by a user. Many other operations may be facilitated similarly. For instance, the computing device 102 may allow edits to object 106 data represented by a node 122, may change the status of a particular object 106 represented by a node 122, may print information related to the node 122, may install or uninstall software represented by the node 122, etc.

Figure 3:
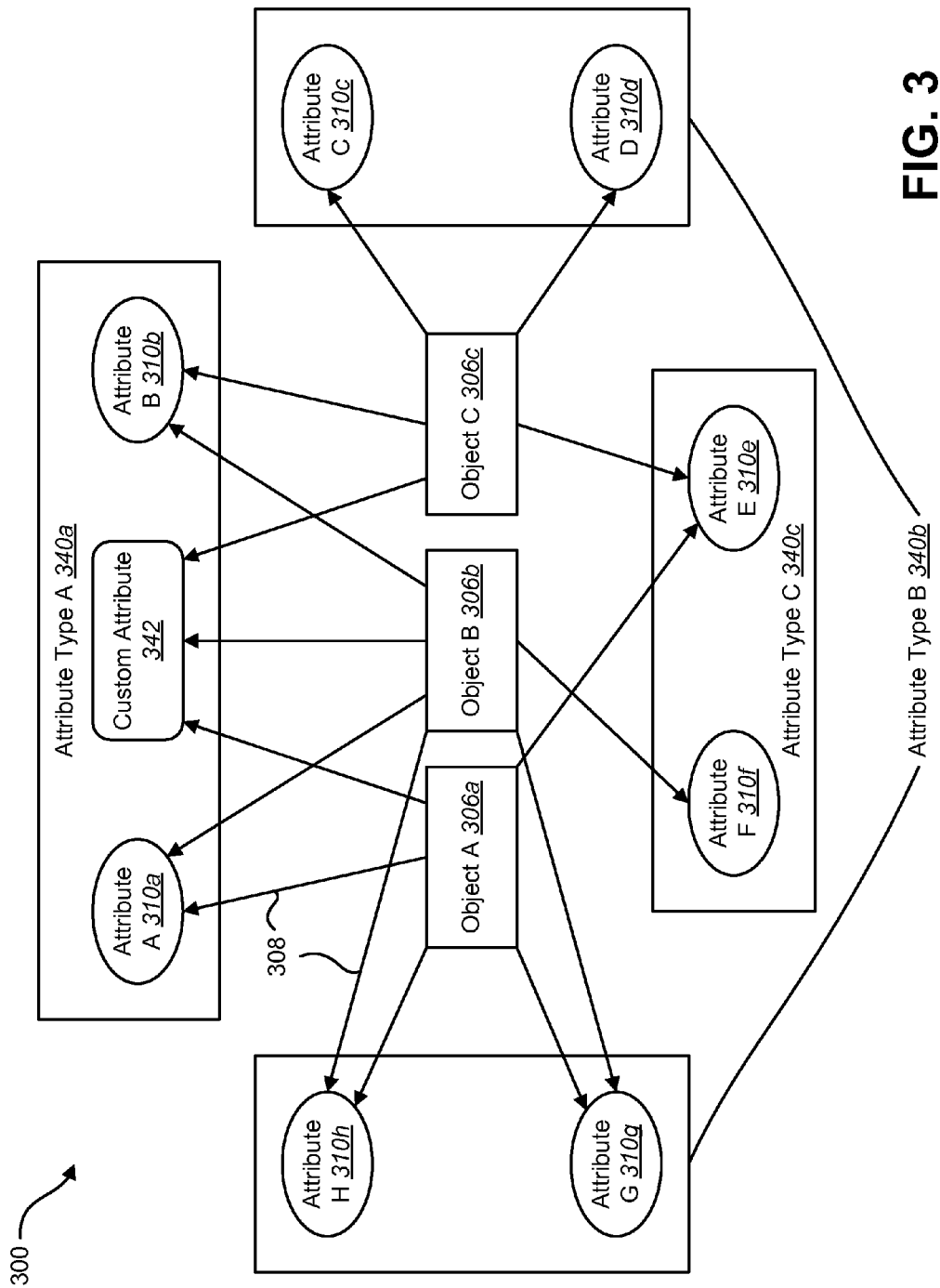
FIG. 3 is a diagram illustrating one example of a graph.

FIG. 3 is a diagram illustrating one example of a graph 300. The graph 300 illustrated in FIG. 3 includes several objects 306a-c, attributes 310a-h, 342 and relationships 308. It should be noted that all of the arrows between an object 306 and an attribute 310, 342 in FIG. 3 represent relationships 308. The objects 306a-c, attributes 310a-h, 342 and/or relationships 308 may be represented as part of graph data 104, for example. In one configuration, the objects 306a-c, attributes 310a-h, 342 and/or relationships 308 may be represented as bits of data in memory on a computing device 102. For example, graph data 104 may comprise strings of bits that represent data, memory addresses and/or pointers. In one configuration, the graph data 104 may be stored in a database.

Attributes 310a-h, 342 may represent attributes or properties of the objects 306a-c. Assuming that the objects 306a-c are software products, for example, one attribute 310 may represent the kind of Operating System (OS) that an object 306 is compatible with. Other attributes 310 may represent an object 306 manufacturer, vendor, state, group and/or other properties. A custom attribute 342 may be an attribute that is defined based on input. For example, a user may input a custom attribute 342 that is a group. For instance, assume that object A 306a represents GarageBand (an audio program), object B 306b represents iTunes (a media player program) and object C 306c represents Cakewalk (an audio program). The custom attribute 342 may be a music software group that relates to object A 306a (e.g., GarageBand), object B 306b (e.g., iTunes) and object C 306c (e.g., Cakewalk). It should be noted that zero, one or more (e.g., multiple) custom attributes 342 may be used in accordance with the systems and methods herein.

According to the systems and methods disclosed herein, attributes 310a-h, 342 may be classified or categorized into attribute types 340a-c. In the example illustrated in FIG. 3, several attribute types 340a-c are shown. For example, attribute type A 340a includes attribute A 310a, a custom attribute 342 and attribute B 310b. Furthermore, attribute type B 340b includes attribute C 310c, attribute D 310d, attribute G 310g and attribute H 310h. Additionally, attribute type C 340c includes attribute E 310e and attribute F 310f. The attribute types 340 may be used to synthesize a hierarchy 126 in a tree structure 120. For example, each attribute type 340 may be mapped to a particular hierarchy 126 level. This may be only one of many possible ways to model a hierarchy.

An attribute type 340 may include different kinds of attributes 310. For example, assume that attribute H 310h represents Apple (e.g., a software manufacturer), attribute G 310g represents Computer Discount Warehouse or CDW (e.g., a vendor), attribute C 310c represents Sweetwater (e.g., a vendor) and attribute D 310d represents Roland (e.g., a manufacturer). Thus attribute type B 340b includes both manufacturer attributes and vendor attributes.

A graph 300 (e.g., represented by graph data 104) may be mapped to a tree structure 120. More detail on how this may be accomplished according to the systems and methods herein is given below.

Figure 4:
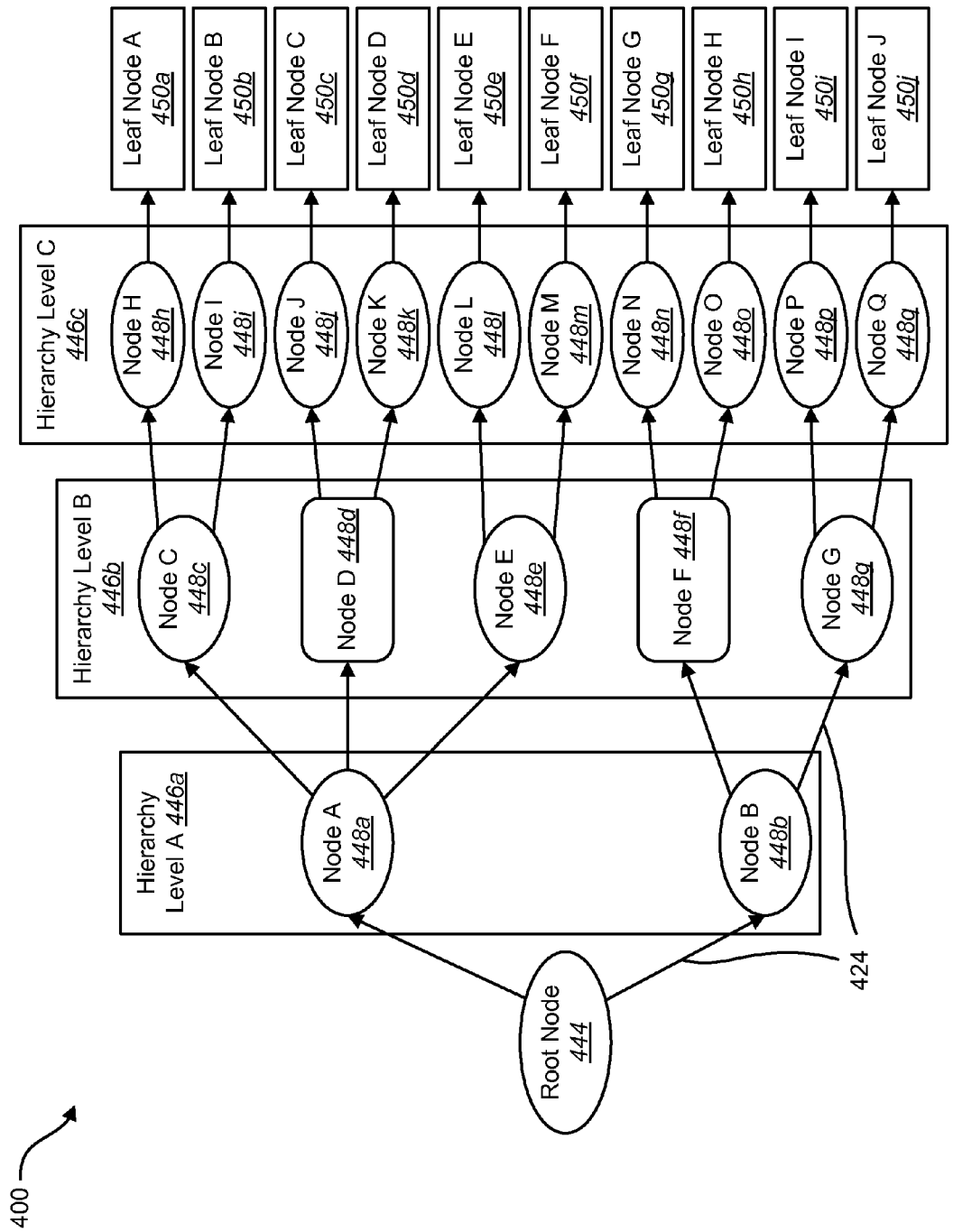
FIG. 4 is a diagram illustrating one example of a tree structure.

FIG. 4 is a diagram illustrating one example of a tree structure 400. In this example, the tree structure 400 includes a root node 444, several internal nodes 448a-q and several leaf nodes 450a-j. The tree structure 400 also includes several hierarchy levels 446a-c. All of the arrows between nodes 444, 448a-q, 450a-j represent node relationships 424. The tree structure 400 example illustrated in FIG. 4 may be generated and/or mapped to based on the graph 300 example illustrated in FIG. 3.

The tree structure 400 nodes 448a-q, 450a-j may be generated and/or mapped to based on objects 306a-c and/or attributes 310a-h, 342 from a graph 300. It should be noted that the root node 444 may be generated based on an object 306 and/or attribute 310. Alternatively, the root node 444 may be generated independent of an object 306 and/or attribute 310.

In general, when a tree structure is generated and/or mapped to according to the systems and methods herein, several criteria may be met. These criteria may be observed when comparing the example of the graph 300 illustrated in FIG. 3 to the example of the tree structure 400 illustrated in FIG. 4. For example, one criterion is that objects 306 in a graph 300 are mapped to leaf nodes 450 in the tree structure 400. Leaf nodes 450 may be nodes that do not have any child nodes or that are not related to any descendant nodes. Another criterion is that node relationships 424 are transitive. More specifically, a node 448a-q, 450a-j in the tree structure 400 is related to another node 448a-q, 450a-j if there is a path (e.g., strictly upward or downward) from the one node 448a-q, 450a-j to the other node 448a-q, 450a-j. For example, if an object 306 has relationships 308 to two attributes 310 in a graph 300, then a path (e.g., strictly upward or downward) between corresponding nodes 448, 450 will exist in the tree structure 400. For instance, this strictly upward or downward path in the tree 400 may contain both attributes (represented by nodes 448) and the object (represented by a leaf node 450). It should be noted that in FIGS. 4, 6 and 7, "downward" may be referred to or defined as progressing from the left to the right of the diagram and "upward" may be defined as progressing from the right to the left of the diagram or vice-versa.

Another criterion that may be met is that there is a synthesized hierarchy of nodes 444, 448, 450. In other words, a linearized sequence or chain of nodes 448 mapped from attributes 310, 342 may not be unique. For example, there may be many possible orderings of the nodes 448 mapped from attributes 310, 342. In one configuration, an ordering may be determined or selected (e.g., "tuned") in order to meet a particular preference. This ordering may be manifested according to hierarchy levels 446. In one example of an ordering, assume that attribute type C 340c corresponds to hierarchy level A 446a, attribute type A 340a corresponds to hierarchy level B 446b and attribute type B 340b corresponds to hierarchy level C 446c. In this example, only attributes E-F 310e-f in attribute type C 340c may be mapped to nodes A-B 448a-b in hierarchy level A 446a. Furthermore, only attributes A-B 310a-b and the custom attribute 342 in attribute type A 340a may be mapped to nodes C-G 448c-g in hierarchy level B 446b. Additionally, only attributes C-D 310c-d and G-H 310g-h may be mapped to nodes H-Q 448h-q in hierarchy level C 446c. However, other orderings (and hence, other hierarchies 126) may be used.

Another criterion that may be met is that a single object 306a-c or attribute 310a-h, 342 may be represented one or more times (as multiple nodes 450, for example) in the tree structure 400. For instance, the custom attribute 342 in the graph 300 illustrated in FIG. 3 may correspond to or be represented by node D 448d and node F 448f in the tree structure 400. Furthermore, a single object 306a-c may be represented as one or more leaf nodes 450.

It should also be noted that while some nodes 448 may be repeated in different branches of the tree structure 400, it is not always the case that every internal node 448 is repeated across every branch. The tree structure 400 may be driven partially in a bottom-up fashion, where the attributes of an object determine which nodes appear in its list of progenitors.

Figure 5:
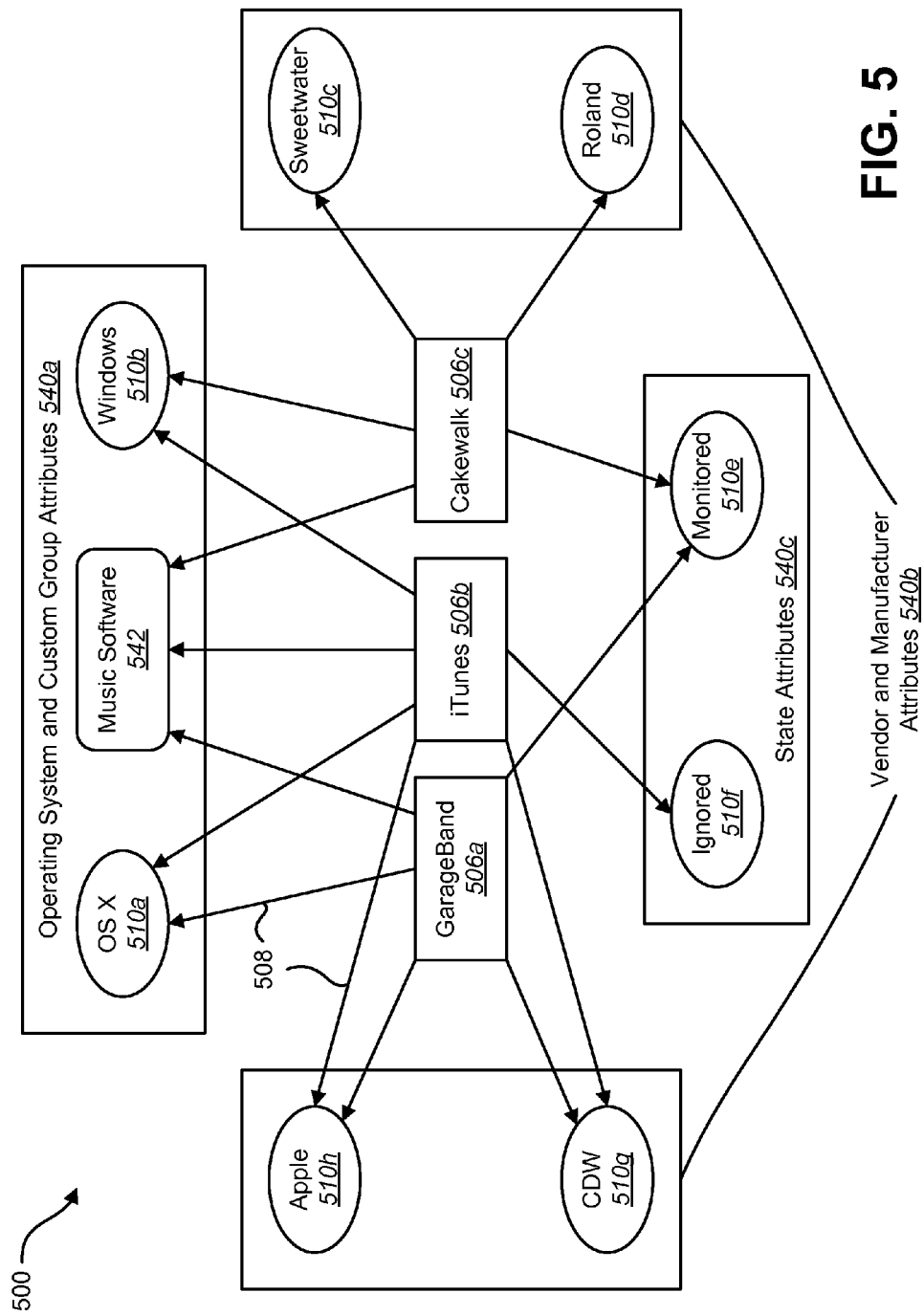
FIG. 5 is a diagram illustrating a more specific example of a graph.

FIG. 5 is a diagram illustrating a more specific example of a graph 500. The graph 500 illustrated in FIG. 5 includes several objects 506a-c, attributes 510a-h, 542 and relationships 508. It should be noted that all of the arrows between an object 506 and an attribute 510, 542 in FIG. 5 represent relationships 508. The objects 506a-c, attributes 510a-h, 542 and/or relationships 508 may be represented as part of graph data 104, for example.

In the example illustrated in FIG. 5, the objects 506a-c represent different programs, namely, GarageBand 506a (an audio program), iTunes 506b (a media player program) and Cakewalk 506c (an audio program). Attributes 510a-h, 542 of these programs include operating systems, manufacturers, vendors, states and a group. More specifically, one or more of the programs represented by the objects 506a-c may be compatible with or run on OS X (an operating system made by Apple) 510a and/or Windows (an operating system made by Microsoft) 510b. The programs 506a-c may be grouped into a custom music software group 542. Furthermore, one or more of the programs 506a-c may be manufactured by Apple 510h or Roland 510d, may be sold by CDW 510g or Sweetwater 510c and/or may have an ignored 510f or monitored 510e state. The music software attribute 542 may be a custom attribute. In some configurations, custom attributes may be generated based on user input. Furthermore, in other examples, zero, one or multiple custom attributes may be used in accordance with the systems and methods disclosed herein.

According to the systems and methods disclosed herein, the attributes 510a-h, 542 may be classified or categorized into attribute types 540a-c. In the example illustrated in FIG. 5, several attribute types 540a-c are shown. For example, the operating system and custom group attributes type 540a includes OS X 510a, the custom music software group 542 and the Windows 510b operating system. Furthermore, the vendor and manufacturer attributes type 540b includes Sweetwater 510c, Roland 510d, CDW 510g and Apple 510h. Additionally, the state attributes type 540c includes the monitored state 510e and the ignored state 510f. The attribute types 540 may be used to synthesize a hierarchy 126 in a tree structure 120. For example, each attribute type 540 may be mapped to a particular hierarchy 126 level. This may be only one of many possible ways to model a hierarchy. For instance, Apple 510h and Roland 510d could alternatively be placed into a single attribute type corresponding to manufacturers, and Sweetwater 510c and CDW 510g could be placed in another separate attribute type corresponding to vendors. In one configuration, such categories may be sibling "License Groups" that may be useful for organizing items at a corresponding level in a hierarchy of a tree, for example.

In summary, a graph 500 is illustrated that contains products represented by objects 506 (e.g., GarageBand 506a, iTunes 506b and Cakewalk 506c). The graph 500 also includes attributes 510a-h, 542 (e.g., group memberships). For example, the graph 500 illustrates operating systems OS X 510a and Windows 510b, vendors CDW 510g and Sweetwater 510c, manufacturers Apple 510h and Roland 510d, ignored 510f and monitored 510e statuses (or dispositions) and a music software 542 custom group. These are represented by vertices (or nodes). The relationships 508 between these vertices are represented by edges (e.g., arrows) connecting them. As can be observed according to the graph 500, for example, the Cakewalk program 506c has (graph) relationships 508 with the music software group 542, the Windows 510b operating system, Sweetwater 510c, Roland 510d and the monitored 510e state. A graph 500 (e.g., represented by graph data 104) may be mapped to a tree structure 120. More detail on how this may be accomplished according to the systems and methods herein is given below.

Figure 6:
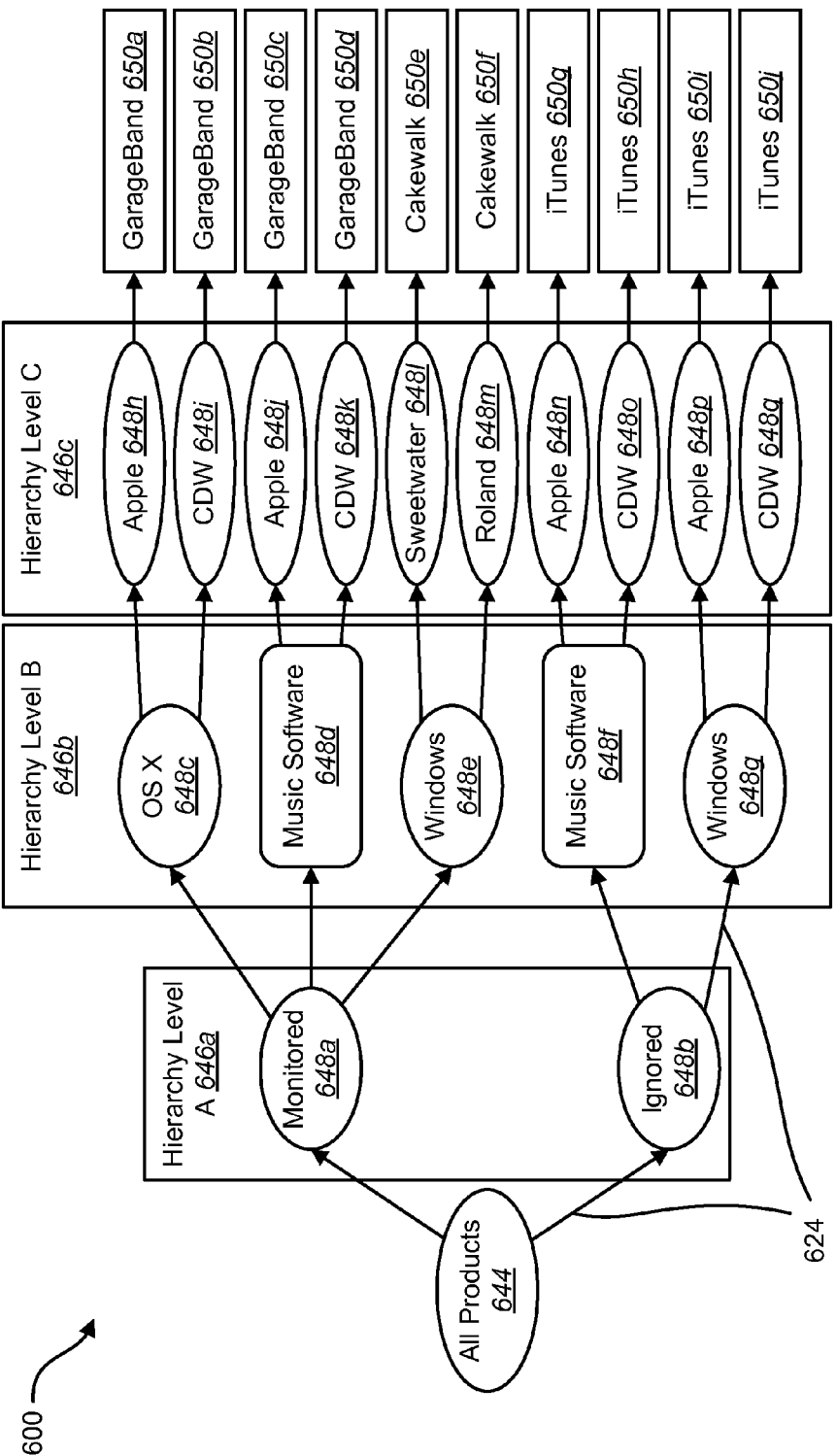
FIG. 6 is a diagram illustrating a more specific example of a tree structure.

FIG. 6 is a diagram illustrating a more specific example of a tree structure 600. In this example, the tree structure 600 includes a root node 644, several internal nodes 648a-q and several leaf nodes 650a-j. The tree structure 600 also includes several hierarchy levels 646a-c. All of the arrows between nodes 644, 648a-q, 650a-j represent node relationships 624. The tree structure 600 example illustrated in FIG. 6 may be generated and/or mapped to based on the graph 500 example illustrated in FIG. 5. In other words, FIG. 6 illustrates a tree structure 600 that may represent the same objects (e.g., products), attributes and relationships illustrated in FIG. 5.

The tree structure 600 nodes 648a-q, 650a-j may be generated and/or mapped to based on objects 506a-c and/or attributes 510a-h, 542 from a graph 500. It should be noted that the "all products" root node 644 may be generated independent of or dependent on an object 506 and/or attribute 510.

In general, when a tree structure is generated and/or mapped to according to the systems and methods herein, several criteria may be met. These criteria may be observed when comparing the example of the graph 500 illustrated in FIG. 5 to the example of the tree structure 600 illustrated in FIG. 6. For example, one criterion is that objects 506 in a graph 500 are mapped to leaf nodes 650 in the tree structure 600. Leaf nodes 650 may be nodes that do not have any child nodes or that are not related to any descendant nodes. For instance, the object representing GarageBand 506a may be mapped to the GarageBand leaf nodes 650a-d. Furthermore, the object representing Cakewalk 506c may be mapped to the Cakewalk leaf nodes 650e-f. Additionally, the object representing iTunes 506b may be mapped to the iTunes leaf nodes 650g-j.

Another criterion is that node relationships 624 are transitive. For instance, a node 648a-q, 650a-j in the tree structure 600 is related to another node 648a-q, 650a-j if there is a path (e.g., strictly upward or downward) from the one node 648a-q, 650a-j to the other node 648a-q, 650a-j. For example, because OS X 510a has a relationship 508 with GarageBand 506a and GarageBand 506a has a relationship 508 with Apple 510h in the graph 500 illustrated in FIG. 5, the OS X node 648c has a relationship with an Apple node 648h in the tree structure 600 in FIG. 6. In general, if an object 506 has a relationship 508 to two attributes 510 in a graph 500, then a path (e.g., strictly upward or downward) between corresponding nodes 648, 650 will exist in the tree structure 600. More specifically, this illustrates an implied relationship. However, the relationship may or may not be stronger than the fact that they are both attributes 510 of an object 506 (e.g., the attributes 510 in a weaker case may be related to each other through their mutual relationship to the object 506). For instance, the GarageBand object 506a has a relationship 508 to both attribute OS X 510a and attribute Apple 510h because both of those attributes 510a, 510h are in a strictly upward path from GarageBand 506a, even though GarageBand 506a, while directly linked to Apple 510h, is indirectly (transitively) linked to OS X 510a.

A note regarding the relationships between attributes represented by nodes in a strictly upward or downward path through the tree may be in order here. For example, if "Apple" 648n (a manufacturer) and "Music Software" 648f (a custom Product Group) are both in a single path between "iTunes" 650g (a product) and "All Products" 644 (the root of the tree 600), then there is a relationship between "Apple" 648n and "Music Software," 648f. However, in this case, it is a weak relationship. For example, they are both attributes of a single product (such as a person may have two friends Joe and Marvin indicating that Joe and Marvin are related through that person, for instance). However, more (inferred) relationships are not necessarily valid. For instance, it may or may not be valid that Apple produces Music Software, or that Music Software is integral to Apple, or that Joe and Marvin are friends to each other. However, the systems and methods disclosed herein may not be meant to imply such weak relationships but, rather, to inform that each of these attributes is related to (e.g., applies to) a product 650 that is a leaf of the tree 600.

Another criterion that may be met is that there is a synthesized hierarchy of nodes 644, 648, 650. In other words, a linearized sequence or chain of nodes 648 mapped from attributes 510, 542 may not be unique. For example, there may be many possible orderings of the nodes 648 mapped from attributes 510, 542. In one configuration, an ordering may be determined or selected (e.g., "tuned") in order to meet a particular preference. This ordering may be manifested according to hierarchy levels 646.

In one example of an ordering, assume that state attributes 540c correspond to hierarchy level A 646a, operating system and custom group attributes 540a correspond to hierarchy level B 646b and vendor and manufacturer attributes 540b correspond to hierarchy level C 646c. In this example, the monitored 510e attribute in state attributes 540c may be mapped to a monitored 648a node and the ignored 510f attribute in state attributes 540c may be mapped to an ignored 648b node in hierarchy level A 646a. In other words, the attributes 510e-f in the state attributes 540c may be mapped to nodes 648a-b in hierarchy level A 646a. Furthermore, the OS X 510a attribute may be mapped to the OS X 648c node, the Windows attribute 510b may be mapped to the Windows 648e, 648g nodes and the (custom) music software attribute 542 may be mapped to music software nodes 648d, 648f. In other words, the attributes 510a-b, 542 in operating system and custom group attributes 540a may be mapped to nodes 648c-g in hierarchy level B 646b. Additionally, the Apple 510h attribute may be mapped to Apple 648h, 648j, 648n nodes and the CDW 510g attribute may be mapped to CDW 648i, 648k, 648o, 648q nodes. Also, the Sweetwater 510c attribute may be mapped to the Sweetwater 648l node and the Roland 510d attribute may be mapped to the Roland 648m node. In other words, attributes 510c-d, 510g-h from the vendor and manufacturer attributes 540b may be mapped to nodes 648h-q in hierarchy level C 646c.

Another criterion that may be met is that a single object 506a-c or attribute 510a-h, 542 may be represented one or more times (as multiple nodes 650, 648 for example) in the tree structure 600. For instance, the (custom) music software attribute 542 in the graph 500 may be mapped to music software nodes 648d, 648f in the tree structure 600. Also, the Windows object 510b may be mapped to two Windows 648e, 648g nodes. Furthermore, the Apple 510h attribute may be mapped to four Apple 648h, 648j, 648n, 648p nodes and the CDW 510g attribute may be mapped to four CDW 648i, 648k, 648o, 648q nodes. Additionally, the GarageBand 506a object may be mapped to four GarageBand 650a-d leaf nodes, the iTunes 506b object may be mapped to four iTunes 650g-j leaf nodes and the Cakewalk 506c object may be mapped to two Cakewalk 650e-f leaf nodes in this example.

It should also be noted that while some nodes 648 may be repeated in different branches of the tree structure 600, it is not always the case that every internal node is repeated across every branch. For example, under the monitored 648a node, we see that Apple 648h, 648j nodes appear under a music software node 648d and under the OS X 648c node, but not under a Windows 648e node, whereas an Apple 648p node does appear under a Windows 648g node under the ignored 648b node branch of the tree structure 600. The reason for this difference is that while the iTunes 506b object has a relationship 508 with both the OS X 510a attribute and the Windows 510b attribute, the GarageBand 506a object 506a has a relationship 508 only with the OS X 510a attribute (and not with the Windows 510b attribute). The reason for this is further because the GarageBand 506a object has a relationship 508 with the Apple 510h attribute, whereas the Cakewalk 506c object has no relationship to the Apple 510h attribute. The relationship 508 that the GarageBand 506a object has to the Apple 510h attribute determines that Apple nodes 648h, 648j respectively appear in the branch with the monitored 648a and OS X 648c nodes and in the branch with the monitored 648a and music software 648d nodes in the tree structure 600. The fact that the Cakewalk 506c object has no relationship 508 with the Apple 510h attribute (and no other objects mapped to nodes under the branch with the monitored 648a and Windows 648e nodes have a relationship 508 with the Apple 510h attribute) determines that an Apple node does not appear in the branch with the monitored 648a and Windows 648e nodes. In this way, the tree structure 600 is driven partially in a bottom-up fashion, where the attributes of an object determine which nodes appear in its list of progenitors.

Figure 7:
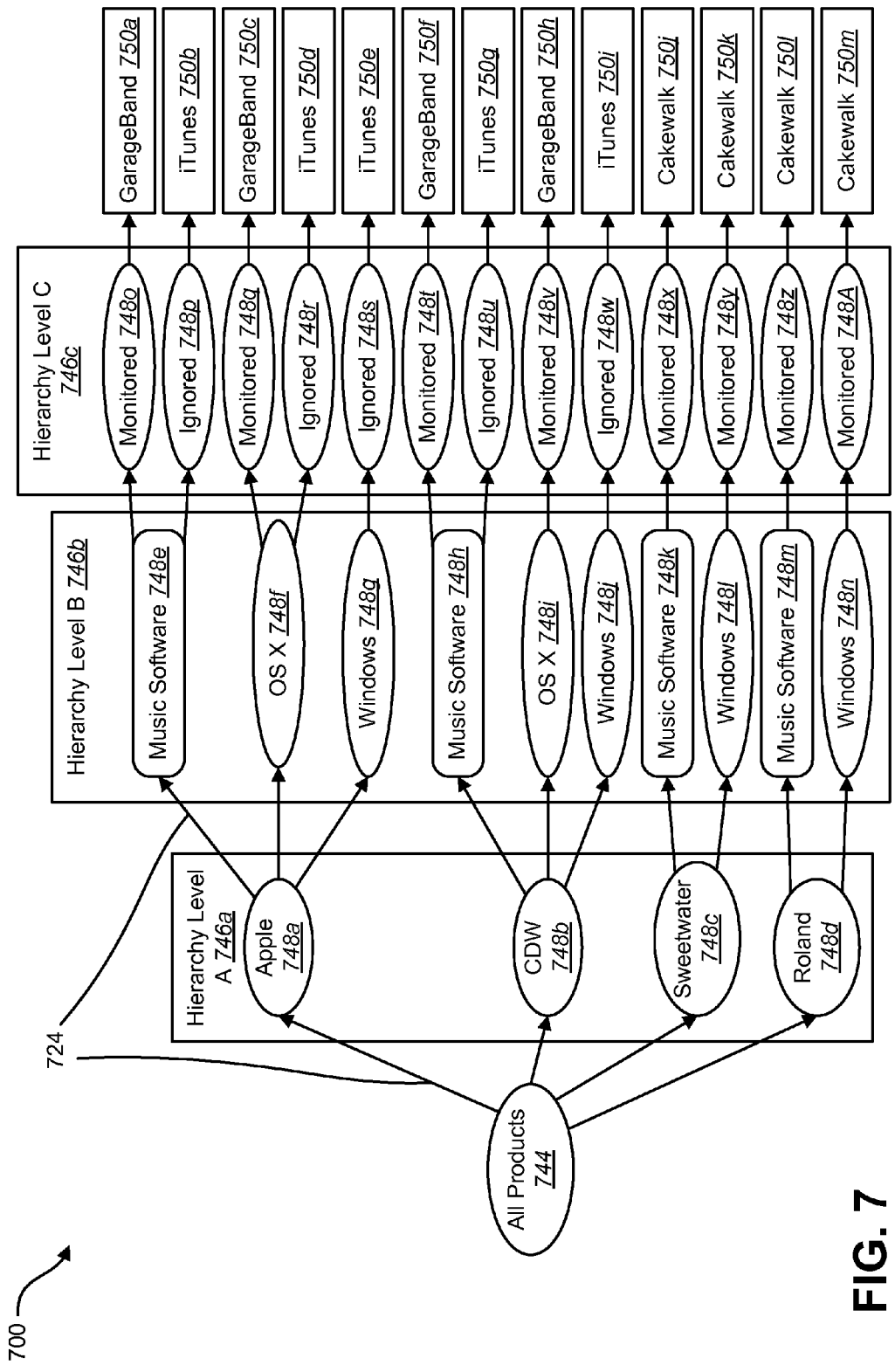
FIG. 7 is a diagram illustrating another more specific example of a tree structure.

FIG. 7 is a diagram illustrating another more specific example of a tree structure 700. In this example, the tree structure 700 includes a root node 744, several internal nodes 748a-A and several leaf nodes 750a-m. The tree structure 700 also includes several hierarchy levels 746a-c. All of the arrows between nodes 744, 748a-A, 750a-m represent node relationships 724. The tree structure 700 example illustrated in FIG. 7 may be generated and/or mapped to based on the graph 500 example illustrated in FIG. 5. In other words, FIG. 7 illustrates a tree structure 700 that may represent the same objects (e.g., products), attributes and relationships illustrated in FIG. 5. As may be observed, however, the example illustrated in FIG. 7 is different from the example illustrated in FIG. 6, even though both may be generated based on the example illustrated in FIG. 5. For example, FIG. 7 illustrates a different "tuning" than the example illustrated in FIG. 6. FIG. 7 illustrates a different arrangement that could be an "optimal" arrangement of the levels of hierarchy in another configuration.

The tree structure 700 nodes 748a-A, 750a-m may be generated and/or mapped to based on objects 506a-c and/or attributes 510a-h, 542 from a graph 500. It should be noted that the "all products" root node 744 may be generated independent of an object 506 and/or attribute 510.

In general, when a tree structure is generated and/or mapped to according to the systems and methods herein, several criteria may be met. These criteria may be observed when comparing the example of the graph 500 illustrated in FIG. 5 to the example of the tree structure 700 illustrated in FIG. 7. For example, one criterion is that objects 506 in a graph 500 are mapped to leaf nodes 750 in the tree structure 700. Leaf nodes 750 may be nodes that do not have any child nodes or that are not related to any descendant nodes. For instance, the object representing GarageBand 506a may be mapped to the GarageBand leaf nodes 750a, 750c, 750f, 750h. Furthermore, the object representing Cakewalk 506c may be mapped to the Cakewalk leaf nodes 750j-m. Additionally, the object representing iTunes 506b may be mapped to the iTunes leaf nodes 750b, 750d-e, 750g, 750i.

Another criterion is that node relationships 724 are transitive. For instance, a node 748a-A, 750a-m in the tree structure 700 is related to another node 748a-A, 750a-m if there is a path (e.g., strictly upward or downward) from the one node 748a-A, 750a-m to the other node 748a-A, 750a-m. For example, because OS X 510a has a relationship 508 with GarageBand 506a and GarageBand 506a has a relationship 508 with Apple 510h in the graph 500 illustrated in FIG. 5, an OS X node 748f has a relationship with the Apple node 748a in the tree structure 700 in FIG. 7. In general, if an object 506 has a relationship 508 to two attributes 510 in a graph 500, then a path (e.g., strictly upward or downward) between corresponding nodes 748, 750 will exist in the tree structure 700.

Another criterion that may be met is that there is a synthesized hierarchy of nodes 744, 748, 750. In other words, a linearized sequence or chain of nodes 748 mapped from attributes 510, 542 may not be unique. For example, there may be many possible orderings of the nodes 748 mapped from attributes 510, 542. The fact that the sequence or chain of nodes 748 may not be unique is illustrated by the difference between FIG. 6 and FIG. 7. For instance, the state attributes 540c (e.g., ignored 510f and monitored 510e) are mapped to hierarchy level A 646a in the tree structure 600 illustrated in FIG. 6, but are mapped to hierarchy level C 746c in the tree structure illustrated in FIG. 7. In one configuration, an ordering may be determined or selected (e.g., "tuned") in order to meet a particular preference. For instance, the ordering illustrated in FIG. 7 may be determined or selected (in comparison to the ordering illustrated in FIG. 6, for example) in a case where navigating the tree structure 700 with vendor and manufacturer attributes 540b higher in the hierarchy is more convenient. This ordering may be manifested according to hierarchy levels 746.

In the example of ordering illustrated in FIG. 7, the state attributes 540c correspond to hierarchy level C 746c, operating system and custom group attributes 540a correspond to hierarchy level B 746b and vendor and manufacturer attributes 540b correspond to hierarchy level A 746a. In this example, the monitored 510e attribute in state attributes 540c may be mapped to monitored nodes 748o, 748q, 748t, 748v, 748x-A and the ignored 510f attribute in state attributes 540c may be mapped to ignored nodes 748p, 748r-s, 748u, 748w in hierarchy level C 746c. In other words, the attributes 510e-f in the state attributes 540c may be mapped to nodes 748o-A in hierarchy level C 748c. Furthermore, the OS X 510a attribute may be mapped to the OS X nodes 748f, 748i, the Windows attribute 510b may be mapped to the Windows nodes 748g, 748j, 748l, 748n and the (custom) music software attribute 542 may be mapped to music software nodes 748e, 748h, 748*k*, 748*m*. In other words, the attributes 510*a-b*, 542 in operating system and custom group attributes 540*a* may be mapped to nodes 748*e-n* in hierarchy level B 746*b*. Additionally, the Apple 510*h* attribute may be mapped to the Apple 748*a* node and the CDW 510*g* attribute may be mapped to the CDW 748*b* node. Also, the Sweetwater 510*c* attribute may be mapped to the Sweetwater 748*c* node and the Roland 510*d* attribute may be mapped to the Roland 748*d* node. In other words, attributes 510*c-d*, 510*g-h* from the vendor and manufacturer attributes 540*b* may be mapped to nodes 748*a-d* in hierarchy level A 746*a*.

Another criterion that may be met is that a single object 506*a-c* or attribute 510*a-h*, 542 may be represented one or more times (as multiple nodes 750, 748, for example) in the tree structure 700. For instance, the (custom) music software attribute 542 in the graph 500 may be mapped to music software nodes 748*e*, 748*h*, 748*k*, 748*m* in the tree structure 700. Also, the Windows object 510*b* may be mapped to four Windows nodes 748*g*, 748*j*, 748*l*, 748*n*. Furthermore, the ignored 510*f* attribute may be mapped to five ignored nodes 748*p*, 748*r-s*, 748*u*, 748*w* nodes and the monitored 510*e* attribute may be mapped to eight monitored 748*o*, 748*q*, 748*t*, 748*v*, 748*x*-A nodes. Additionally, the GarageBand 506*a* object may be mapped to four GarageBand 750*a*, 750*c*, 750*f*, 750*h* leaf nodes, the iTunes 506*b* object may be mapped to five iTunes 750*b*, 750*d*, 750*e*, 750*g*, 750*i* leaf nodes and the Cakewalk 506*c* object may be mapped to four Cakewalk 750*j-m* leaf nodes in this example.

It should also be noted that while some nodes 748 may be repeated in different branches of the tree structure 700, it is not always the case that every internal node is repeated across every branch. As mentioned above, the tree structure 700 is driven partially in a bottom-up fashion, where the attributes of an object determine which nodes appear in its list of progenitors.

Figure 8:
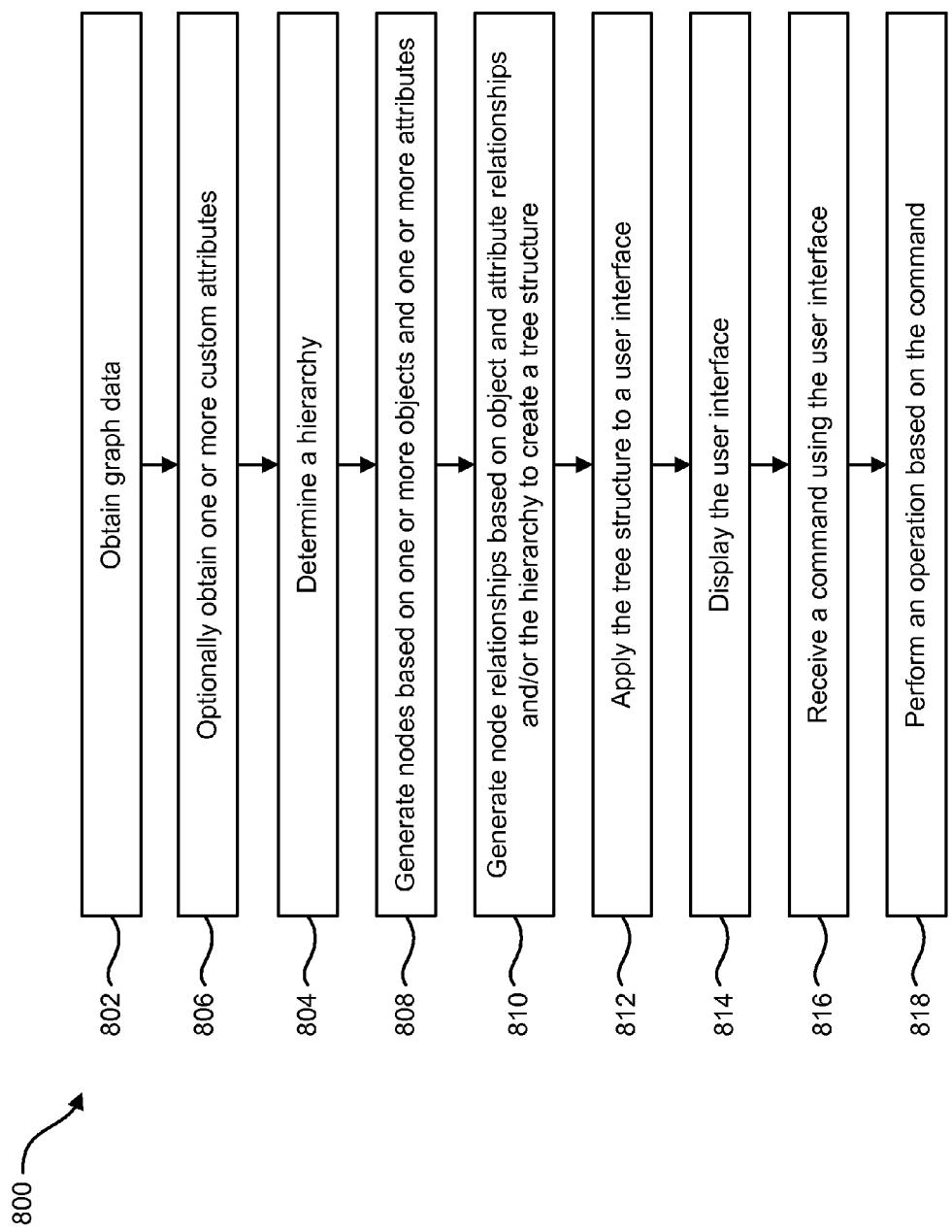
FIG. 8 is a flow diagram illustrating a more specific configuration of a method for mapping graph data to a tree structure on a computing device.

FIG. 8 is a flow diagram illustrating a more specific configuration of a method 800 for mapping graph data to a tree structure on a computing device. A computing device 102 may obtain 802 graph data 104. For example, the computing device 102 may obtain 802 graph data 104 from a file, user input, network communications, etc. For instance, a file containing object 106, relationship 108 and/or attribute 110 information may be received from external media and stored in computing device 102 memory. Graph data 104 may be additionally or alternatively obtained 802 over a network (e.g., Local Area Network (LAN), the Internet, etc.) of computing devices. Additionally or alternatively, the computing device 102 may receive user input including graph data 104. In some configurations, the graph data 104 may be stored in a database.

The computing device 102 may optionally obtain 806 one or more custom attributes. For example, the computing device 102 may receive an input that adds an attribute to one or more objects 106. In one configuration, a user may utilize a user interface 130 to specify that a new group attribute applies to one or more objects 106. For instance, the computing device 102 may receive an input specifying a custom "music software" group attribute 542 that is applied to a GarageBand object 506*a*, an iTunes object 506*b* and a Cakewalk object 506*c*. A custom attribute may be one that is not already associated to certain objects or one that is not a default attribute of certain objects, for example. A custom attribute may be used independently of other attributes or may be grouped with other attributes (into an attribute type, for example). Custom attributes may be used similar to other attributes for mapping into a tree structure.

The computing device 102 may determine 804 a hierarchy. For example, the computing device 102 may synthesize or generate a hierarchy 126. This may be done using a hierarchy setting such as a pre-defined order, user input and/or a determination algorithm. For instance, the pre-defined order used to determine 804 the hierarchy 126 may dictate that a particular attribute type (or group of attribute types, for example) should be mapped to a particular hierarchy level or should be mapped to a hierarchy level that is higher or lower relative to another attribute type. It should be noted that determining 804 a hierarchy may utilize all attributes to be used in that hierarchy, including any optional custom attributes.

Additionally or alternatively, the hierarchy determination 804 may be made using an input (e.g., user input). For example, the computing device 102 may receive an instruction (by way of a user interface 130, for example) that dictates a particular hierarchy 126 or settings (e.g., rules) to be used in generating the hierarchy 126. For instance, the computing device 102 may display several attribute types that may be mapped to a hierarchy 126. The computing device 102 may then receive an input that specifies a hierarchy 126 or settings for the hierarchy. For example, the input may specify that certain attribute types should be grouped and/or an ordering to follow in mapping those attribute types to the tree structure 120. Additionally or alternatively, the input may specify that certain attribute types should take priority (e.g., be mapped higher in the hierarchy 126) than other attribute types.

Additionally or alternatively, the hierarchy determination 804 may be made using a determination algorithm. For example, a determination algorithm may specify that the hierarchy 126 should be ranked according to the number of attributes within attribute types. For instance, the algorithm may specify that attribute types having fewer attributes should be placed higher in the hierarchy 126. In another example, the algorithm may specify a hierarchy ordering based on an order in a database or according to memory addresses. For instance, the algorithm may specify that attribute types stored at lower database table indices should be placed higher in the hierarchy 126 than other attributes types stored at higher database table indices. Other orderings or schemes for ordering may be used.

The computing device 102 may generate 808 tree structure 120 nodes 122 based on one or more graph data 104 objects 106 and/or one or more attributes 110. For example, nodes 122 may be created using graph data 104 objects 106. Leaf nodes 122 (e.g., nodes without any child nodes) corresponding to the graph data 104 objects 106 may be generated 808. Other nodes 122 (e.g., internal nodes) may be generated 808 based on the attributes 110 (e.g., regular attributes and/or custom attributes).

The computing device 102 may generate 810 node relationships based on object and attribute relationships and/or the hierarchy to create a tree structure. For example, the computing device 102 may generate a tree structure 120 relationship 124 (and/or path) between tree structure 120 nodes 122 based on graph data 104 relationships 108 between objects 106 and attributes 110. For instance, if a graph data 104 relationship exists between an object 106 and an attribute 110, the computing device 102 may generate 810 a corresponding tree structure 120 relationship 124 (and/or path) between a (leaf) node 122 corresponding to the object 106 and another node 122 corresponding to the attribute 110. The tree structure 120 relationships 124 may additionally or alternatively be based on the hierarchy 126. For example, the computing device 102 may order the nodes 122 and relationships 124 based on the hierarchy 126. More specifically, those nodes 122 that are related to each other may be ordered in a path according to an order dictated by the hierarchy 126.

By determining 804 a hierarchy, generating 808 nodes and generating 810 node relationships according to the systems and methods herein, a computing device 102 may map the graph data 104 to the tree structure 120. It should be noted that the tree structure 120 may be generated partially in a "bottom-up" fashion, where the leaf nodes 122 (based on graph data 104 objects 106, for example) are used to determine their ancestor or progenitor tree structure 120 nodes 122. It should also be noted that the computing device 102 may generate one or more other nodes (e.g., a root node) for the tree structure 120. For example, the computing device 102 may generate a root node in order to couple branches in the tree structure 120 together. The root node may be generated by default, according to a user input and/or according to some other procedure or algorithm.

The computing device 102 may apply 812 the tree structure 120 to a user interface 130. For example, the computing device 102 may provide the tree structure 120 to a user interface 130 such that the user interface 130 may interact with the tree structure 120 and/or perform some operation based on the tree structure 120. This may allow the user interface 130 to display the tree structure 120 (e.g., a representation of the tree structure 120) and/or its 120 nodes 122, to navigate the tree structure 120, to filter tree structure 120 information and/or perform other operations using and/or based on the tree structure 120.

The computing device 102 may display 814 the user interface 130. For example, the computing device 102 may render the user interface 130 on a display 136. This may provide a user with a visual representation of the user interface that allows the user to interact with the user interface 130. In some instances, displaying 814 the user interface 130 may also display information related to the tree structure 120. For example, information related to one or more nodes 122 and/or relationships 124 may be displayed using the user interface 130.

The computing device 102 may receive 816 a command using the user interface. In some configurations, commands may be received 816 by way of an input device 138. For example, the computing device 102 may receive 816 a command to display the tree structure 120, to navigate the tree structure 120, to filter data based on the tree structure 120, to perform some operation on one or more objects 106 and/or attributes 110 corresponding to one or more nodes 122 in the tree structure 120 and/or to perform some other operation using the tree structure 120. For example, the user interface 130 may detect a "click" (e.g., a mouse-down event, mouse-up event, etc.) on a button on the user interface 130 corresponding to a particular operation. For instance, the user interface 130 may include a control (e.g., button) that commands the computing device 102 to navigate up (or down, for example) the tree structure 120. The user interface 130 may additionally or alternatively include a control (e.g., button, link, etc.) that commands the computing device 102 to display more information corresponding to a tree structure 120 node 122 (and hence corresponding to a graph data 104 object 106 and/or attribute 110). The user interface 130 may additionally or alternatively include a control (e.g., button, link, etc.) that commands the computing device 102 to filter information using the tree structure 120. For instance, a link corresponding to a node 122 may command the computing device 102 to stop displaying information about nodes in other branches of the tree structure 120 and to display more information about the node 122 and any related child nodes 122.

Many other commands may be received according to the systems and methods disclosed herein. For example, a user may enter text in a text box on the user interface 130 to add an object 106 or attribute 110, edit information related to an object 106 or attribute 110 to modify (e.g., add, edit, delete, etc.) relationships 108, etc. This may be done using the tree structure 120. For example, the tree structure 120 may indicate or point to graph data 104 to be modified. Yet other commands may be received (e.g., a command to order a (software) product, change a product license, block the use of a product, update a product, order a product, contact a product vendor, print a report, etc.) using the tree structure 120 (e.g., nodes 122, relationships 124, hierarchy 126, etc.).

The computing device 102 may perform 818 an operation using the tree structure 120. The operation may be performed 818 based on a received 816 command. For example, the computing device 102 may navigate the tree structure 120, filter tree structure 120 information and/or perform some other operation using the tree structure 120. For instance, the computing device 102 may display information relating to a selected node 122, such as one or more ancestor nodes 122 and/or one or more descendant nodes 122. The computing device 102 may "navigate" to another node by displaying information regarding that node 122.

Additionally or alternatively, the computing device 102 may filter tree structure 120 information. For example, the computing device 102 may display a subset of tree structure 120 nodes 122 or information. For example, the computing device 102 may display only the parent node 122 of a selected node 122 and any immediate child nodes 122 of the selected node 122. This may allow a user to view only a portion of the tree structure 122 information at a time. Navigation and filtering may also occur concurrently. For example, the computing device 102 may traverse the tree structure 120 nodes 122 and filter (e.g., display only a subset of) the tree structure 120 data according to user input. For instance, assume that the user interface 130 is currently displaying node A that has two child nodes, node B and node C. When the user clicks on node B, the user interface 130 stops displaying node C and displays node B's child nodes, node D and node E. In this manner, the computing device 102 may allow tree structure 120 filtering and navigation. In other words, one of the applications of the systems and methods disclosed herein involves creating a tree like structure 1020 representing a filter. A user is able to navigate through the tree 1020 to any particular node 1022 (not necessarily a leaf node 1022), filtering a data set to the desired size and quality.

The computing device 102 may additionally or alternatively perform 818 other operations using the tree structure 120. For example, the computing device 102 may traverse the tree structure 120 and perform operations based on the nodes 122. For example, a user may desire to order a product that is a descendent node of some attribute, such as a brand or manufacturer. Initially, the user may be presented with several brands or manufacturers. Upon selecting a brand node, the user interface 130 may navigate to that brand node and display product nodes of that brand. The computing device 102 may then place an order for a product represented by the product node when clicked by a user. Many other operations may be facilitated accordingly. For instance, the computing device 102 may allow edits to object 106 data represented by a node 122, may change the status of a particular object 106 represented by a node 122, may print information related to the node 122, may install or uninstall software represented by the node 122, may contact a vendor (e.g., open an email editor with a vendor email address populated in an address field), block a user from using a software product represented by the node 122, retrieve usage information for software represented by the node 122, etc.

Figure 9:
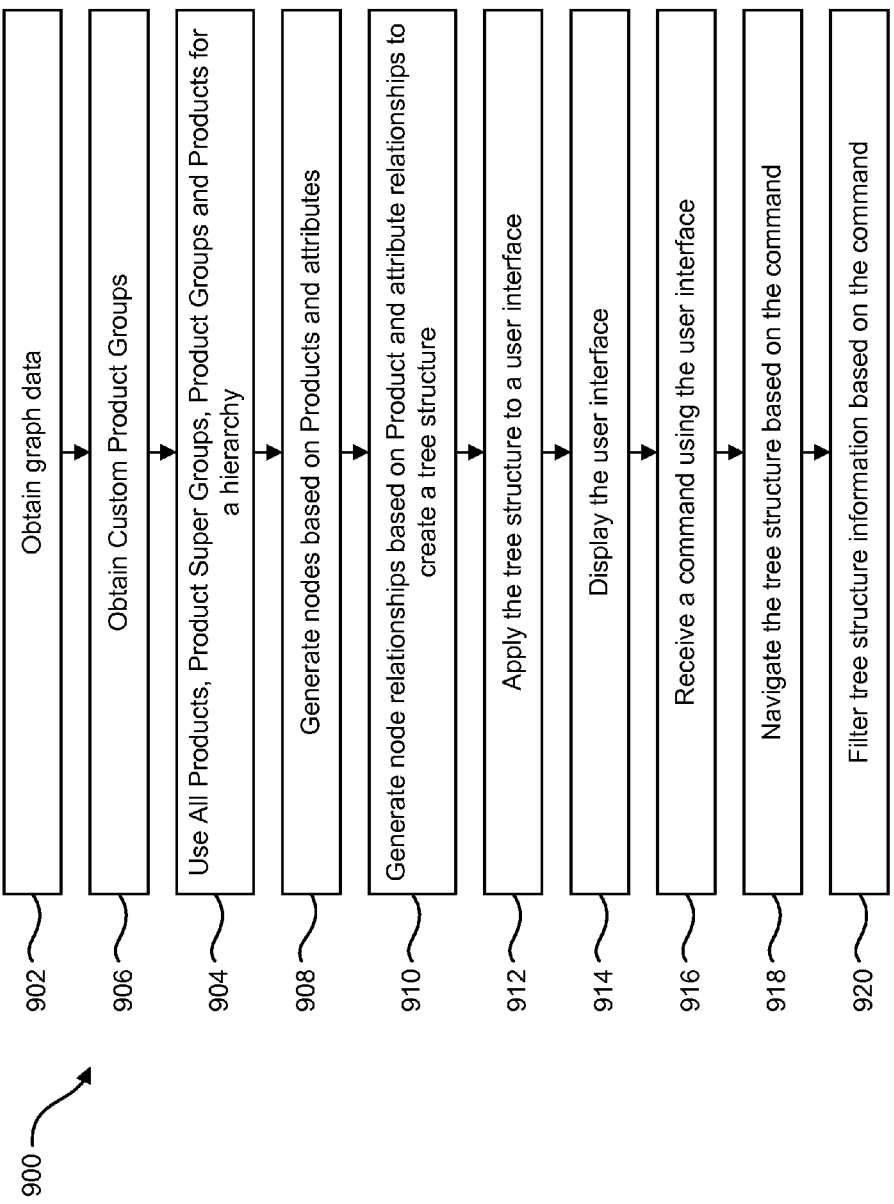
FIG. 9 is a flow diagram illustrating another more specific configuration of a method for mapping graph data to a tree structure on a computing device.

FIG. 9 is a flow diagram illustrating another more specific configuration of a method 900 for mapping graph data to a tree structure on a computing device. A computing device 102 may obtain 902 graph data 104. For example, the computing device 102 may obtain 902 graph data 104 from a file, user input, network communications, etc. For instance, a file containing object 106, relationship 108 and/or attribute 110 information may be received from external media and stored in computing device 102 memory. Graph data 104 may be additionally or alternatively obtained 902 over a network (e.g., Local Area Network (LAN), the Internet, etc.) of computing devices. Additionally or alternatively, the computing device 102 may receive user input including graph data 104. In some configurations, the graph data 104 may be stored in a database.

The computing device 102 may optionally obtain 906 one or more custom attributes, such as a custom group that qualifies as one of the "Custom Product Groups." For example, the computing device 102 may receive an input that adds a custom group attribute to one or more objects 106. In one configuration, a user may utilize a user interface 130 to specify a custom group attribute that applies to one or more objects 106. For instance, the computing device 102 may receive an input specifying a custom "music software" group attribute 542 that is applied to a GarageBand object 506a, an iTunes object 506b and a Cakewalk object 506c.

The computing device 102 may use 904 tiered categories for a hierarchy. These tiered categories may be pre-defined or defined using received input. For example, the computing device 102 may use "All Products," "Product Super Groups," "Product Groups" and "Product" categories or types for a hierarchy 126. "All Products" may be classified as a top category or type, "Product Super Groups" and "Product Groups" as intermediate categories or types and "Product" as a bottom category or type. In this case, "All Products" is the top category in the hierarchy 126, "Product Super Groups" may be immediately below "All Products," "Product Groups" may be immediately below "Product Super Groups" and "Product" may be below "Product Groups" at the bottom of the hierarchy 126. "Product Super Groups" may include "Discovered," "Monitored" and "Ignored" attributes, for example. These Product Super Groups are set-membership (state) attributes of the "Products." It should be noted that under "Product Super Groups" are "Product Groups" of two kinds: "Automatic Product Groups" and "Custom Product Groups." "Automatic Product Groups" may be created automatically to correspond to a "Manufacturer" attribute of a product, whereas "Custom Product Groups" may represent set membership according to arbitrary user preferences. With this particular hierarchy 126 or ordering, the user may be able to focus on "Monitored" products and then pay attention to those Products from specific "Manufacturers" such as Adobe or Microsoft. As needed, the user may then pay more particular attention to specific "Products" such as Office or Photoshop. This hierarchy or structure serves as a filter on "Product" usage data.

The computing device 102 may generate 908 tree structure 120 nodes 122 based on Products (e.g., objects 106) and/or attributes 110. For example, nodes 122 may be created using graph data 104 objects 106. Leaf nodes 122 (e.g., nodes without any child nodes) corresponding to the "Product" objects 106 may be generated 908. Other nodes 122 (e.g., internal nodes) may be generated 908 based on the attributes 110 within "Product Super Groups" and "Product Groups" (e.g., "Automatic Product Groups" and "Custom Product Groups"). Furthermore, an "All Products" root node 122 for the tree structure 120 may be created. This root node 122 may be created by default to encompass or relate to all objects 106 and/or attributes 110. Alternatively, the root node 122 may be generated based on user input.

The computing device 102 may generate 910 node relationships based on object and attribute relationships and/or the hierarchy to create a tree structure. For example, the computing device 102 may generate a tree structure 120 relationship 124 (and/or path) between tree structure 120 nodes 122 based on graph data 104 relationships 108 between objects 106 and attributes 110. Referring to FIGS. 5 and 6, for instance, the computing device 102 may generate a node relationship 624 between a monitored node 648a and an OS X node 648c because there are (graph 500) relationships 508 between a monitored attribute 510e, a GarageBand object 506a and an OS X attribute 510a. This relationship 624 may also be formed as a result of where the monitored 648a and OS X 648c nodes are in the hierarchy 126. For example, because the monitored node 648a is part of a "Product Super Group" (e.g., for hierarchy level A 646a) and the OS X node 648c is part of a "Product Group" (e.g., for hierarchy level B 646b) that is immediately below the "Product Super Group," the computing device 102 may form this node relationship 624.

By determining 904 a hierarchy, generating 908 nodes and generating 910 node relationships according to the systems and methods herein, a computing device 102 may map the graph data 104 to the tree structure 120. It should be noted that the tree structure 120 may be generated partially in a "bottom-up" fashion, where the leaf nodes 122 are used to determine their ancestor or progenitor tree structure 120 nodes 122. Referring to FIGS. 5 and 6, for example, the monitored node 648a, the OS X node 648c and an Apple node 648h are in a path or branch with a GarageBand leaf node 650a since the monitored attribute 510e, OS X attribute 510a and Apple attribute 510h are each related to the GarageBand object 506a.

The computing device 102 may apply 912 the tree structure 120 to a user interface 130. For example, the computing device 102 may provide the tree structure 120 to a user interface 130 such that the user interface 130 may interact with the tree structure 120 and/or perform some operation based on the tree structure 120. This may allow the user interface 130 to display the tree structure 120 (e.g., a representation of the three structure 120) and/or its 120 nodes 122, to navigate the tree structure 120, to filter tree structure 120 information and/or perform other operations using and/or based on the tree structure 120.

The computing device 102 may display 914 the user interface 130. For example, the computing device 102 may render the user interface 130 on a display 136. This may provide a user with a visual representation of the user interface that allows the user to interact with the user interface 130. In some instances, displaying 914 the user interface 130 may also display information related to the tree structure 120. For example, information related to one or more nodes 122 and/or relationships 124 may be displayed using the user interface 130.

The computing device 102 may receive 916 a command using the user interface. In some configurations, commands may be received 916 by way of an input device 138. For example, the computing device 102 may receive 916 a command to display the tree structure 120, to navigate the tree structure 120, to filter data based on the tree structure 120, to perform some operation on one or more objects 106 and/or attributes 110 corresponding to one or more nodes 122 in the tree structure 120 and/or to perform some other operation using the tree structure 120. For example, the user interface 130 may detect a "click" (e.g., a mouse-down event, mouse-up event, etc.) on a button on the user interface 130 corresponding to a particular operation. For instance, the user interface 130 may include a control (e.g., button) that commands the computing device 102 to navigate up (or down, for example) the tree structure 120. The user interface 130 may additionally or alternatively include a control (e.g., button, link, etc.) that commands the computing device 102 to display more information corresponding to a tree structure 120 node 122 (and hence corresponding to a graph data 104 object 106 and/or attribute 110). The user interface 130 may additionally or alternatively include a control (e.g., button, link, etc.) that commands the computing device 102 to filter information using the tree structure 120. For instance, a link corresponding to a node 122 may command the computing device 102 to stop displaying information about nodes in other branches of the tree structure 120 and to display more information about the node 122 and any related child nodes 122.

The computing device 102 may navigate 918 the tree structure 120 based on the command. For example, the computing device 102 may navigate the tree structure 120. For instance, the computing device 102 may display information relating to a selected node 122, such as one or more ancestor nodes 122 and/or one or more descendant nodes 122. The computing device 102 may "navigate" to another node by displaying information regarding that node 122. For instance, a user may click on a representation of a particular node 122, which the computing device 102 may then navigate to. More specifically, the computing device 102 may navigate up, down and/or laterally (e.g., to sibling nodes) using the tree structure 120.

Additionally or alternatively, the computing device 102 may filter 920 tree structure 120 information. For example, the computing device 102 may display a subset of tree structure 120 nodes 122 or information. For example, the computing device 102 may display only the parent node 122 of a selected node 122 and any immediate child nodes 122 of the selected node 122. This may allow a user to view only a portion of the tree structure 122 information at a time. Navigation 918 and filtering 920 may also occur concurrently. For example, the computing device 102 may navigate 918 the tree structure 120 nodes 122 and filter (e.g., display only a subset of) 920 the tree structure 120 data according to user input. For instance, assume that the user interface 130 is currently displaying node A that has two child nodes, node B and node C. When the user clicks on node B, the user interface 130 stops displaying node C and displays node B's child nodes, node D and node E. In this manner, the computing device 102 may allow tree structure 120 filtering 920 and navigation 918.

The computing device 102 may additionally or alternatively perform other operations using the tree structure 120. For example, the computing device 102 may traverse the tree structure 120 and perform operations based on the nodes 122. For example, a user may desire to order a product that is a descendent node of some attribute, such as a brand or manufacturer. Initially, the user may be presented with several brands or manufacturers. Upon selecting a brand node, the user interface 130 may navigate to that brand node and display product nodes of that brand. The computing device 102 may then place an order for a product represented by the product node when clicked by a user. Many other operations may be facilitated accordingly. For instance, the computing device 102 may allow edits to object 106 data represented by a node 122, may change the status of a particular object 106 represented by a node 122, may print information related to the node 122, may install or uninstall software represented by the node 122, may contact a vendor (e.g., open an email editor with a vendor email address populated in an address field), block a user from using a software product represented by the node 122, retrieve usage information for software represented by the node 122, etc. In one configuration, these other operations may be performed over a network.

In one configuration, the tree 120 may be generated "lazily" or only as needed, where only a part of the tree 120 may be visible at any one time. Once the hierarchy is determined 804, Product Super Groups (e.g., Discovered, Monitored, Ignored) may be displayed. In one instance, a computing device 102 may receive an input or command (e.g., from a user) indicating a selection of one of these Product Super Groups (e.g., "Monitored"). All of the objects 106 may then be examined to determine which ones have the "Monitored" attribute 110. The resulting Products may be examined to determine which Product Groups the objects 106 are associated with. Associated Product Groups may then become the nodes 122 of the next level down in the hierarchy 126. Consider, for example, a case where these associated Product Groups include "OS X" and "Music Software." The computing device 102 may present these Product Groups in a user interface. The computing device 102 may then receive an input or command (from a user, for example) indicating the selection of "Music Software." Then, all Products would be examined that have both "Monitored" and "Music Software" as attributes 110. The resulting set of Products (those with associations to both "Monitored" and "Music Software") may then be presented on a display 136. This is only one way in which the tree 120 could be generated, and may be configured in this way due to a constraint/opportunity of displaying only a portion of the tree 120 (chiefly the ancestors of a given node 122) at any one time. The tree 120 may be generated in other ways, particularly if there were a requirement to display the whole tree 120 at once or to generate the whole tree eagerly to improve interaction performance.

Figure 10:
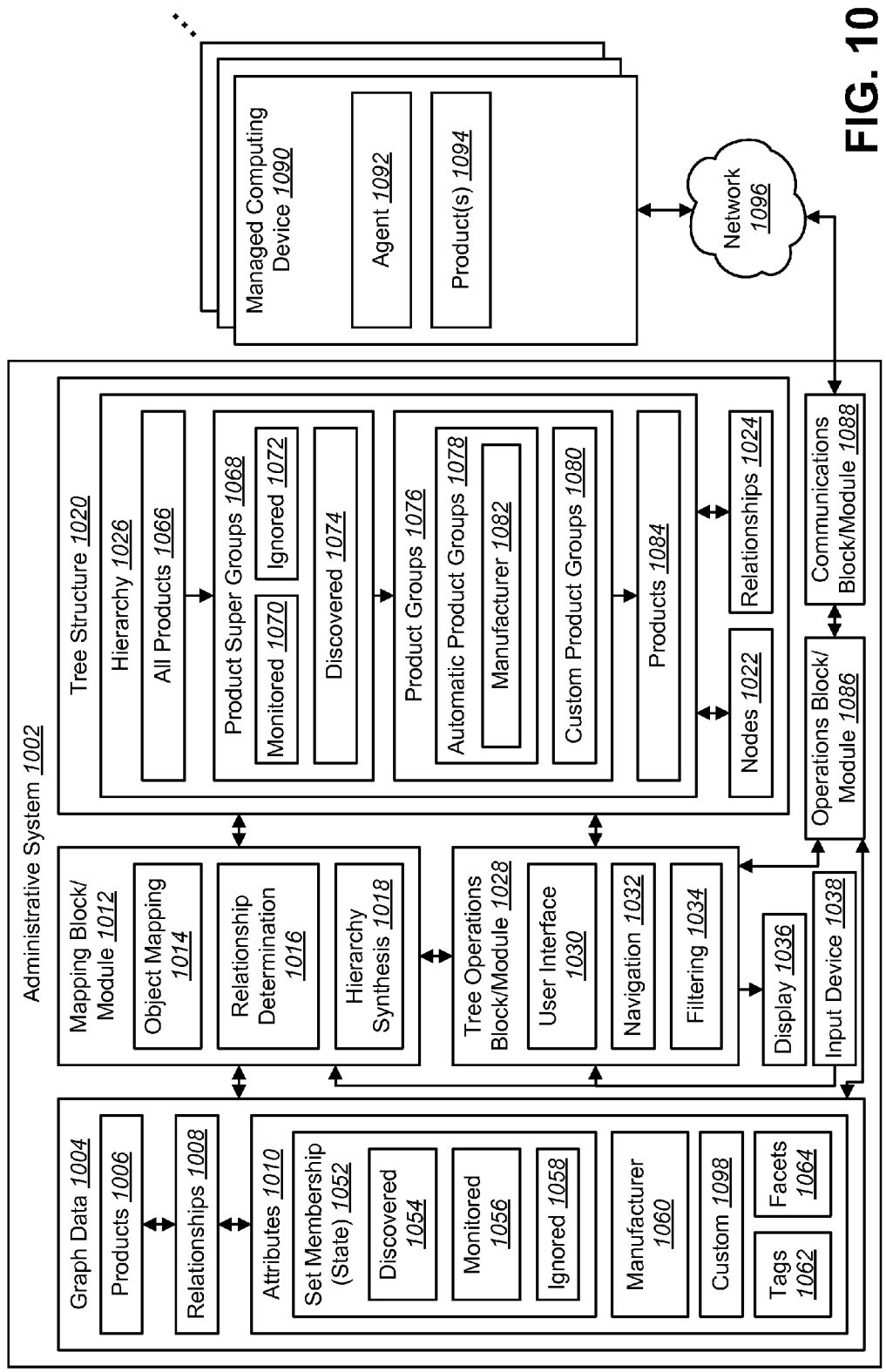
FIG. 10 is a block diagram illustrating one configuration of an administrative system in which systems and methods for mapping graph data to a tree structure may be implemented.

FIG. 10 is a block diagram illustrating one configuration of an administrative system 1002 in which systems and methods for mapping graph data 1004 to a tree structure 1020 may be implemented. The administrative system 1002 may include graph data 1004, a mapping block/module 1012, a tree structure 1020, a tree operations block/module 1028, a display 1036, an input device 1038, an operations block/module 1086 and/or a communications block/module 1088. Examples of the administrative system 1002 include desktop computers, laptop computers, servers, supercomputers, tablet devices, cellular phones, smartphones, gaming systems and any other computing device. As used herein, a "block/module" may be implemented in hardware, software or a combination of both.

The graph data 1004 may be data that is structured according to a graph. For example, the graph data 1004 may include (data representing) one or more products 1006, one or more attributes 1010 and/or one or more relationships 1008. A product 1006 may be data representing an entity. For example, a product 1006 may be data that represents software, hardware, a computer, etc. An attribute 1010 may be an attribute of a product 1006. In this example, the attributes 1010 include manufacturers 1060, a set membership (e.g., state) 1052, an optional custom 1098 attribute, an optional tag 1062 attribute and/or an optional facet attribute 1064. For example, the systems and methods disclosed herein may also be applied to other data relationships that can be mapped to graphs, such as facets 1064 and tags 1062. For example, facets 1064 and tags 1062 may be used as attributes, similar to custom 1098 attributes.

In this example, the state attribute 1052 may be a discovered 1054 state, monitored 1056 state or ignored 1058 state. In one configuration, a discovered 1054 state may mean that a product 1094 (corresponding to a product 1006 object) has been discovered on a managed computing device 1090, a monitored 1056 state may mean that the administrative system 1002 is monitoring (e.g., keeping a log on, requesting information, etc.) a product 1094 (corresponding to a product 1006 object) and an ignored 1058 state may mean that the administrative system 1002 is ignoring a product 1094 (corresponding to a product 1006 object). A relationship 1008 may relate products 1006 to each other, attributes 1010 to each other and/or one or more products 1006 to one or more attributes 1010. For example, an iTunes product 1006 (representing iTunes software, for example) may be related to an Apple attribute 1010 using a relationship 1008 (indicating that iTunes is manufactured by Apple, for example).

The mapping block/module 1012 may used to map graph data 1004 to a tree structure 1020. The mapping block/module 1012 may be implemented in hardware, software or a combination of both. The mapping block/module 1012 may include an object mapping block/module 1014, a relationship determination block/module 1016 and/or a hierarchy synthesis block/module 1018. For example, the mapping block/module 1012 may generate one or more nodes 1022, one or more relationships 1024 and/or a hierarchy 1026 in order to generate the tree structure 1020 and/or map graph data 1004 to the tree structure 1020. In one configuration, the mapping block/module 1012 generates a root node 1022 for the tree structure 1020 that is related to other nodes 1022.

The object mapping block/module 1014 may map one or more products 1006 to one or more nodes 1022 (in the tree structure 1020). For example, each of the products 1006 may be mapped to one or more "leaf" nodes 1022 in the tree structure 1020. A "leaf" node 1022 may be a node 1022 that has no "child" nodes 1022 and one or no parent node 1022. For example, an iTunes leaf node 1022 may have an Apple parent node 1022 related to it and no child nodes 1022.

The relationship determination block/module 1016 may determine and/or generate relationships 1024 in the tree structure 1020 based on graph data 1004 relationships 1008. For example, the relationship determination block/module 1016 may map a graph data 1004 relationship 1008 to one or more tree structure 1020 relationships 1024. The tree structure 1020 relationships 1024 may be transitive. For example, one node 1022 is related to another node 1022 (according to graph data relationships 1008, for example) if there is a path (e.g., strictly upward or downward) between the nodes 1022. It should be noted that that relationship may be no stronger than the fact that both nodes 1022 represent attributes 1010 associated with a given object. The relationship between two attribute 1010 nodes may be stronger than that, but it is not a requirement.

The hierarchy synthesis block/module 1018 may be used to synthesize or generate a hierarchy 1026 for the tree structure 1020. For example, the tree structure 1020 may include a hierarchy 1026 that determines a sequence or ordering of the nodes 1022. For example, the one or more products 1006 may be mapped to leaf nodes 1022 as discussed above. However, the sequence or chain followed by the other nodes 1022 (mapped from attributes 1010, for example) may be determined based on the hierarchy 1026. This is because the hierarchy 1026 may not be unique. Different orderings or sequences in a hierarchy 1026 may be used. The hierarchy synthesis block/module 1018 may follow a pre-set ordering, may determine a hierarchy 1026 using a particular algorithm and/or may determine a hierarchy 1026 based on an input. For example, a user of the administrative system 1002 may prefer to have the nodes 1022 ordered in some particular way. The administrative system 1002 may receive an input (that indicates a preference, for example) from the input device 1038. The hierarchy synthesis block/module 1018 may then synthesize or generate the hierarchy 1026 accordingly.

Thus, the mapping block/module 1012 may generate (e.g., map products 1006, relationships 1008 and/or attributes 1010 to) the tree structure 1020. The tree structure 1020 may include nodes 1022, relationships 1024 and/or a hierarchy 1026. The nodes 1022 may be data that represent the graph data 1004 object(s) 1006 and/or attribute(s) 1010. For example, the tree structure 1020 may arrange nodes 1022 (representing products 1006 and/or attributes 1010) using a root node 1022 with relationships 1024 and other nodes 1022 that branch out from the root node 1022.

In this example, the hierarchy 1026 is structured with "All Products" 1066 at the top of the hierarchy 1026, "Product Super Groups" 1068 immediately beneath "All Products" 1066, "Product Groups" 1076 immediately beneath "Product Super Groups" 1068 and "Products" 1084 immediately beneath "Product Groups" 1076. An "All Products" root node 1022 may correspond to the "All Products" 1066 level in the hierarchy 1026. The "All Products" root node 1022 may be pre-defined, generated by default, by user input or according to an algorithm. The "All Products" root node 1022 may be related to each of the product nodes 1022 (at the "Products" 1084 hierarchy 1026 level) and all of the branches in the tree structure 1020 may proceed from the "All Products" root node 1022.

One or more nodes 1022 that indicate monitored 1070, ignored 1072 or discovered 1074 status may reside at the "Product Super Groups" 1068 hierarchy level. For instance, a product 1006 represented in the graph data 1004 may have a discovered 1054, monitored 1056 or ignored 1058 attribute 1010. The mapping block/module 1012 may generate a node 1022 in the tree structure 1020 corresponding to this attribute 1010, which may be placed or mapped to the "Product Super Group" hierarchy level 1026.

The "Product Groups" 1076 hierarchy level may include "Automatic Product Groups" 1078 and/or "Custom Product Groups" 1080. For example, one "Automatic Product Group" 1078 may be a manufacturer 1082. For instance, a product 1006 with a manufacturer 1060 attribute 1010 may be mapped to a node 1022 at the "Product Group" 1076 hierarchy level. Additionally or alternatively, a product 1006 with a custom 1098 attribute may be mapped to a node 1022 at the "Product Group" 1076 hierarchy level. In one example, an "Automatic Product Group" 1078 node 1022 may be a "sibling" to a "Custom Product Group" 1080 node 1022.

The "Products" 1084 hierarchy level may include one or more nodes 1022 that are generated based on products 1006 from the graph data 1004. The one or more relationships 1008 that a product 1006 has to one or more attributes 1010 may determine the tree structure relationships 1024 (and/or paths) that a node 1022 at the "Products" 1084 hierarchy level has with nodes at the "Product Groups" 1076 hierarchy level and the "Product Super Groups" 1068 hierarchy level.

The tree structure 1020 may be provided to a tree operations block/module 1028. The tree operations block/module 1028 may be used to perform one or more operations using the tree structure 1020. For example, the tree operations block/module 1028 may include a user interface 1030. The user interface 1030 may be presented on the display 1036. The user interface 1030 may be used to access and/or display tree structure 1020 information. For example, the user interface 1030 may allow a user to access the tree structure 1020 nodes 1022. In some configurations, the tree operations block/module 1028 may include navigation 1032 functionality and/or filtering 1034 functionality.

The navigation 1032 functionality may be provided through and/or by the user interface 1030, for example. The user interface 1030 may navigate the one or more nodes 1022 of the tree structure 1020. For instance, a user may input a command to the user interface 1030 (using the input device 1038, for example). The user interface 1030 may display information based on different nodes 1022 based on the command. More specifically, the user interface 1030 may navigate or traverse the tree structure 1020 nodes 1022 using one or more relationships 1024. When navigating, for example, the administrative system 1002 may move between (and/or display information for) nodes 1022 at the "All Products" 1066, "Product Super Groups" 1068, "Product Groups" 1076 and/or "Products" 1084 hierarchy levels.

Additionally or alternatively, the tree operations block/module 1028 may provide navigation 1032 functionality independent of the user interface 1030. For example, the tree operations block/module 1028 may perform one or more operations (e.g., modifying data, storing data, exporting data, printing data and/or performing other operations related to the nodes 1022 (and hence, products 1006), etc.) by navigating the nodes 1022 using navigation 1032 functionality.

The filtering 1034 functionality may be provided through and/or by the user interface 1030, for example. In one configuration, the user interface 1030 may display filtered tree structure 1020 information. For instance, the user interface 1030 may display only nodes 1022 that are related to a selected node 1022. For example, the user interface 1030 may display information about ancestor nodes 1022 (e.g., parent and grandparent nodes 1022, etc.) and descendant nodes 1022 (e.g., child, grandchild nodes 1022, etc.) of a selected node 1022, while not displaying other nodes 1022. In another example, the user interface 1030 may display information about nodes 1022 that are related to a selected node 1022 within a particular number of steps. For instance, only a parent node 1022 (e.g., no grandparent nodes 1022) and immediate child nodes 1022 (e.g., no grandchild nodes) 1022 may be displayed by the user interface 1030 using the filtering 1034 functionality. In one example, if a particular node 1022 at the "Product Groups" 1076 hierarchy level is selected, the administrative system 1002 may filter other nodes 1022 such that only information regarding related nodes 1022 at the "Products" 1084 hierarchy level is displayed. Other operations (e.g., storing, exporting, printing, changing settings for, blocking, allowing, modifying licenses for, updating, etc.) may be performed on a set of filtered nodes 1022 using the filtering 1034 functionality.

Additionally or alternatively, the tree operations block/module 1028 may provide filtering 1034 functionality independent of the user interface 1030. For example, the tree operations block/module 1028 may perform one or more operations on a filtered tree structure 1020. For instance, the tree operations block/module 1028 may store, export, print and/or perform other operations related to a filtered set of nodes 1022 (e.g., related to the corresponding products 1006).

It should be noted that filtering 1034 functionality according to the systems and methods disclosed herein may be implemented using one or more configurations. In one configuration, for example, the administrative system 1002 or computing device 102) may perform filtering 1034 by making a selection of a node in the tree 1020 that will effectively filter what is given below that node in the tree 1020.

The present systems and methods may provide filtering features in order to allow specific queries to be made thereby reducing the total number of items that are displayed. In one configuration, for example, the administrative system 1002 (or computing device 102) may perform filtering 1034 by making a selection of a node in the tree that will effectively filter the contents of another window. "Product Usage" data, for example, may be comprised of records of a particular software product 1094 being used on a particular managed computing device 1090. If a given managed computing device 1090 has, for example, 50 software products 1094 installed and being used, and there are, for example, 1000 computers in an organization, there may potentially be 50000 product usage records stored in an administrative system 1002. This may be a very large amount of data for a human to understand and query. However, the systems and methods disclosed herein may be used to filter the complete set of product usage records into a meaningful and comprehensible set. Thus, when a user selects "All Products" 1066 (e.g., the root of the tree 1020), then the administrative system 1002 (or computing device 102) may display (the next level of the tree 1020) the three Product Super Groups 1068 (e.g., Discovered 1074, Monitored 1070 and Ignored 1072) and (in a separate window, for example) up to 50000 product usage records. If only 5 products are important to the user (and thus attributed with "Monitored" 1070), then selecting "Monitored" 1070 may cause administrative system 1002 (or computing device 102) to display (in the next level of tree 1020) the Product Groups 1076 "Apple," "Music Software" (for example), and perhaps only 5000 product usage records in the other window. Similarly, if the user is only concerned with Monitored software from Apple, then selecting "Apple" in the tree 1020 may show "iTunes" and "GarageBand" as Products 1084 in the next level of the tree, and potentially many fewer product usage records in the other window. Thus, making selections in the tree 1020 may be used for two kinds of filtering, for example. First, reducing the set of items shown in the next level of the tree, and second, reducing the set of product usage records shown in another window.

The display 1036 may be a device used to convey visual information. Examples of displays 1036 include Liquid Crystal Displays (LCDs), Active Matrix Organic Light Emitting Diode (AMOLED) displays, Cathode-Ray Tube (CRT) displays, projectors, etc. The display 1036 may be used to present the user interface 1030. The display 1036 may also display tree structure 1020 information (e.g., node 1022 information, relationship 1024 information, etc.).

The input device 1038 may be used to receive input. Examples of input devices 1038 include keyboards, mice, cameras, touchscreens, microphones, etc. For instance, a user may use an input device 1038 to interact with the user interface 1030. In one configuration, the user may enter a preference for the hierarchy 1026 of the tree structure 1020, navigation commands and/or filtering commands, for example.

The administrative system 1002 may communicate with one or more managed computing devices 1090. For example, the administrative system 1002 may be used to manage one or more managed computing devices 1090. The managed computing devices 1090 may be other computing devices such as desktop computers, laptop computers, tablet devices, smartphones, cellular phones, gaming consoles, etc. In one configuration, the administrative system 1002 may send messages to one or more managed computing devices 1090 instructing the managed computing device(s) 1090 to perform operations. For instance, an administrative system 1002 may instruct one or more managed computing devices 1090 to install software, uninstall software, shut down, reboot, install a patch or update for a product 1094, block access to one or more products 1094 on the managed computing devices 1090, allow access to one or more products 1094 on the managed computing devices 1090, fix or remove security threats (e.g., viruses, Trojans, worms, spyware, malware, adware, etc.), etc.

Communications between the administrative system 1002 and the one or more managed computing devices 1090 may occur using a network 1096. Examples of the network 1096 include Local Area Networks (LANs), the Internet, Wide Area Networks (WANs), etc.

The one or more managed computing devices 1090 may each include an agent 1092 and one or more products 1094. Examples of products 1094 include software, firmware and/or hardware included on the managed computing device 1090. For instance, a product 1094 may be a program (e.g., Microsoft Word, Excel, PowerPoint, Access, Internet Explorer, Windows Media Player, Windows, Apple iTunes, OS X, etc.), firmware and/or hardware (e.g., sound card, video card, display, network card, printer, projector, processor, memory (e.g., Random Access Memory (RAM), hard drive storage, etc.), removable memory/storage, etc.). The agent 1092 may be software and/or hardware that is used to manage and/or perform operations on the managed computing device 1090. For example, the agent 1092 may receive and perform instructions from the administrative system 1002. For instance, the agent may uninstall software, eliminate threats (e.g., viruses, Trojans, worms, malware, adware, spyware, etc.), report information to the administrative system (e.g., usage reports, status, etc.), update firmware, detect unauthorized use, detect unauthorized products 1094 on the managed computing device 1090, etc. This may be done according to instructions received from the administrative system 1002, for example.

The operations block/module 1086 may be used to perform operations on the administrative system 1002. The operations block/module 1086 may be implemented in hardware and/or software. For example, the operations block/module 1086 may communicate information with the tree operations block/module 1028 in order to perform one or more operations using the tree structure 1020. For example, the operations block/module 1086 may instruct the tree operations block/module 1028 to navigate to a certain node 1022 in the tree structure 1020 and/or filter the tree structure 1020 (to a particular subset of nodes 1022, for example). In another example, the operations block/module 1086 may instruct the tree operations block/module 1028 to perform a particular operation using the tree structure 1020, such as updating a status attribute, adding/modifying/deleting a node 1022 (which may be reflected in the tree structure 1020 and/or in the graph data 1004) such as a node 1022 corresponding to a product 1006 or attribute 1010 in the graph data 1004, printing the tree structure 1020, exporting the tree structure 1020, displaying the tree structure 1020, etc.

The administrative system 1002 may use the communications block/module 1088 to communicate with one or more managed computing devices 1090 using a network 1096. For example, the communications block/module 1088 may format and/or send messages to the one or more managed computing devices 1090 using the network 1096. Additionally or alternatively, the communications block/module 1088 may receive messages from the one or more managed computing devices 1090, which it 1088 may provide to the operations block/module 1086.

In one configuration, the administrative system 1002 may perform one or more operations based on communications with the one or more managed computing devices 1090. For example, the administrative system 1002 may receive information from a managed computing device 1090 indicating that a new product 1094 has been installed. The communications block/module 1088 may receive this message and provide it to the operations block/module 1086, which may update the tree structure 1020 (and/or graph data 1004). The graph data 1004 may be updated using to tree operations block/module 1028 and/or independent of the tree operations block/module 1028. For instance, a new product node 1022 (and product 1006 object, for example) may be added with a discovered 1074 status (and discovered 1054 attribute, for example) to the tree structure 1020. In another example, the tree structure 1020 nodes 1022 may be updated based on attribute information received from a managed computing device 1090. For example, the agent 1092 may determine the manufacturer of a product 1094 on a managed computing device 1090, which it 1092 may provide to the administrative system 1002. The tree operations block/module 1028 may update the node 1022 corresponding to a manufacturer 1082. The graph data 1004 may also be updated to reflect this change (e.g., using and/or independent of the tree operations block/module 1028).

In another example, the administrative system 1002 may send information and/or commands to the one or more managed computing devices 1090 based on the tree structure 1020. For example, the administrative system 1002 may navigate through and filter nodes 1022 in the tree structure 1020 and then send a command based on the filtered nodes 1022. For instance, an administrator may desire to update all Windows operating system products 1094 on the managed computing devices 1090. The tree operations block/module 1028 may allow the administrator to navigate the tree structure 1020 and find the Windows operating system product node(s) 1022. The administrator may then provide a command to update all of the Windows operating systems from that node 1022. The administrative system 1002 may then send an update command to all of the corresponding agents 1092 to update Window operating system products 1094.

In one configuration, the systems and methods disclosed herein may be applied to a software license monitoring application (on the administrative system 1002, for example). This software license monitoring application may use inventory data captured by an inventory component of the administrative system 1002 (not illustrated in FIG. 10), and may add software license monitoring-specific data to a database accessible to (and accessed by) a broader set of applications. For example, one or more managed computing devices 1090 may send inventory data (e.g., products used, licenses used, etc.) to the administrative system 1002 for monitoring. This inventory data may be stored and/or incorporated into the tree structure 1020 by the administrative system 1002 as discussed above.

Other applications may use the software license monitoring data. However, the software license monitoring application may primarily be a consumer of the inventory data. Product usage data (partially captured by inventory, and partially computed by the software license monitoring application, for example) is a potentially very large corpus of data, which may be too large and diverse to be easily comprehended in its entirety or effectively queried by an administrator, making a product such as software license monitoring beneficial to be able to answer specific questions about product usage data.

The users of the software license monitoring application may be concerned with the ethical/legal/financial implications of product usage. For example, the users may want to make sure that they have license seats sufficient to cover the product usage within an organization (or risk having to pay fines when they are audited). Furthermore, they may want to reduce over-licensing (e.g., having purchased a greater quantity or quality of license seats than are used). Consequently, the systems and methods disclosed herein may be useful in multiple places in software license management.

For example, they may be used to facilitate the user's quickly narrowing down the list of products 1006 (and their respective usages) of concern (either because the manufacturers of such products are prone to conduct audits, or because the costs of licensing the products is high). The described hierarchy of All Products 1066, Product Super Groups 1068, Product Groups 1076 and Products 1084 may be particularly useful for such purposes, since it may help to quickly and effectively answer questions such as "What is my usage of Microsoft Word?" or "What is my usage of Adobe products?" or "What is my usage of music software?"

The systems and methods disclosed herein may also be used to organize and navigate licenses. Here, a useful hierarchy might comprise All Licenses, License Groups (e.g., Manufacturer, Vendor as automatic License Groups and Custom Licenses Group as a custom group), and Licenses. This hierarchy may help navigate through Licenses to quickly answer questions such as "What are all the licenses I have purchased from CDW?" or "What licenses do I have for Symantec products?" or "How many seats are available (unused) from the Microsoft Office license we purchased in August of 2009?"

Yet another hierarchy could be implemented for computers, such as: All Computers, Computer Groups (e.g., automatic groups such as Domains, Organizational Units; and custom groups such as Custom Computer Group), and Computers. This may be helpful for navigating through a large corpus of computer data to answer such questions as "What computers are being used in a subsidiary?" or "What computers are being used by the corporate design group?" or "What computers are running OS X 10.5 or newer?"

Figure 11:
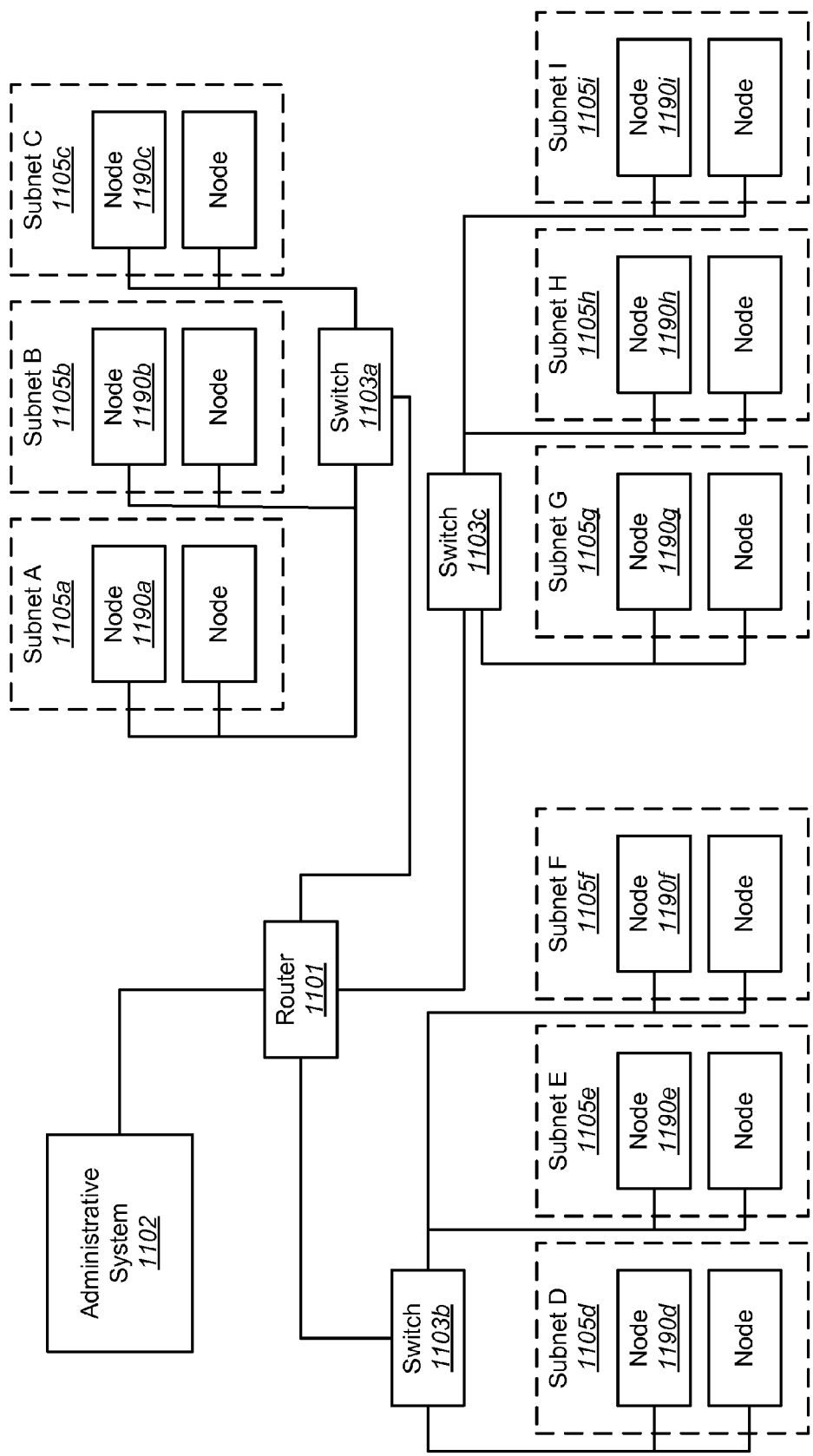
FIG. 11 is a block diagram that illustrates one configuration of a network where systems and methods for mapping graph data to a tree structure on a computing device may be implemented.

FIG. 11 is a block diagram that illustrates one configuration of a network where systems and methods for mapping graph data to a tree structure on a computing device may be implemented. An administrative system 1102 is connected to a router 1101. The router 1101 is connected to switches 1103a, 1103b, 1103c. The switch 1103a is connected to several nodes 1190a, 1190b, 1190c, etc. via their respective subnets 1105a, 1105b, 1105c. The switch 1103b is connected to several nodes 1190d, 1190e, 1190f, etc. via their respective subnets 1105d, 1105e, 1105f. The switch 1103c is connected to several nodes 1190g, 1190h, 1190i, etc. via their respective subnets 1105g, 1105h, 1105i. In FIG. 11, the nodes 1190 may be, for example, managed computing devices 1090 (not to be confused with nodes 122 in a tree structure 120, for example). Although FIG. 11 only shows one router 1101, and a limited number of switches 1103, subnets 1105, and nodes 1190, many and varied numbers of routers 1101, switches 1103, subnets 1105, and nodes 1190 may be included in networks and/or systems where systems and methods for mapping graph data to a tree structure on a computing device may be implemented.

Figure 12:
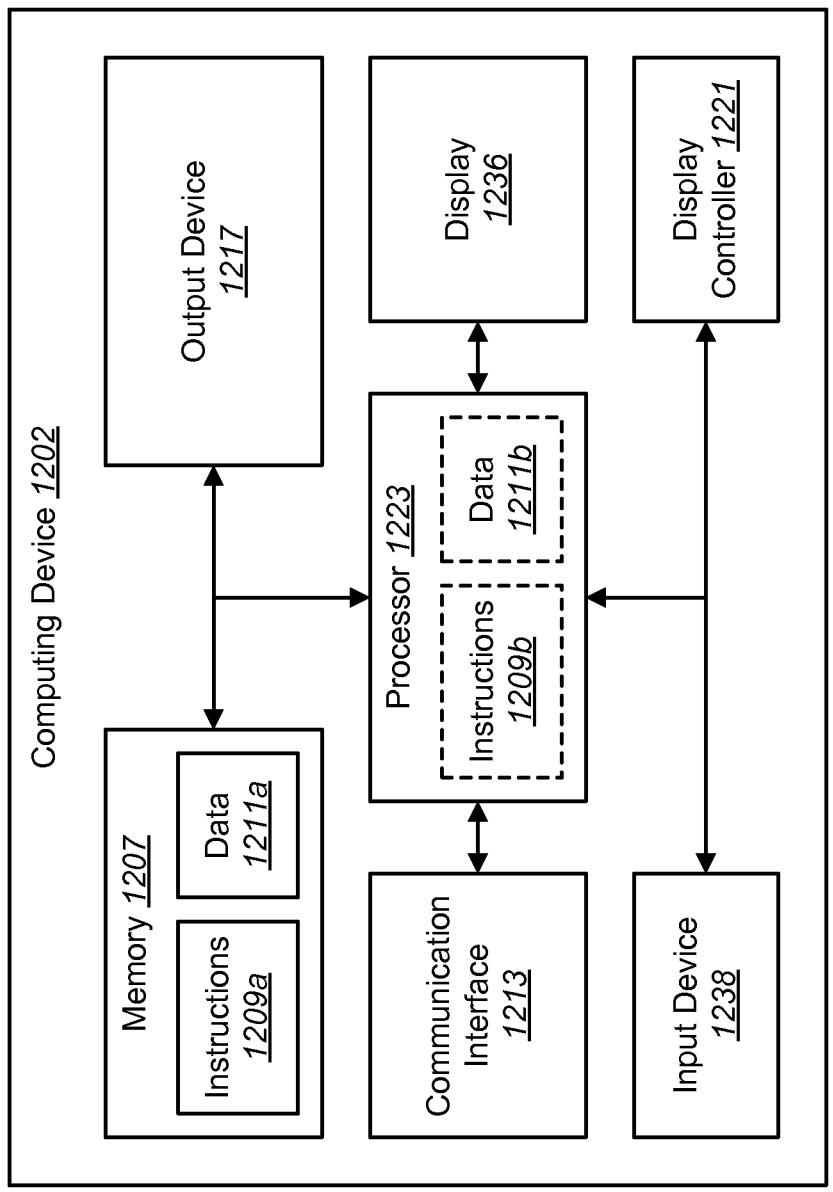
FIG. 12 illustrates various components that may be utilized on a computing device for mapping graph data to a tree structure.

FIG. 12 illustrates various components that may be utilized on a computing device 1202. The computing device 102, administrative system 1002, 1102 and/or managed computing device(s) 1090 described above may be configured similar to the computing device 1202 illustrated in FIG. 12. The illustrated components may be located within the same physical structure or in separate housings or structures.

The computing device 1202 may include a processor 1223 and memory 1207. The processor 1223 controls the operation of the computing device 1202 and may be embodied as a microprocessor, a microcontroller, a digital signal processor (DSP) or other device known in the art. The memory 1207 may include instructions 1209a and data 1211a. The processor 1223 typically performs logical and arithmetic operations based on program instructions 1209a and data 1211a stored within the memory 1207. That is, instructions 1209b and data 1211b may be stored and/or run on the processor 1223.

The computing device 1202 typically may include one or more communication interfaces 1213 for communicating with other electronic devices. The communication interfaces 1213 may be based on wired communication technology, wireless communication technology, or both. Examples of different types of communication interfaces 1213 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1202 typically may include one or more input devices 1238 and one or more output devices 1217. Examples of different kinds of input devices 1238 include a keyboard, mouse, microphone, remote control device, button, joystick, trackball, touchpad, lightpen, etc. Examples of different kinds of output devices 1217 include a speaker, printer, etc. One specific type of output device which may be typically included in a computer system is a display device 1236. Display devices 1236 used with embodiments disclosed herein may utilize any suitable image projection technology, such as a cathode ray tube (CRT), liquid crystal display (LCD), light-emitting diode (LED), gas plasma, electroluminescence, or the like. A display controller 1221 may also be provided, for converting data stored in the memory 1207 into text, graphics, and/or moving images (as appropriate) shown on the display device 1236.

Of course, FIG. 12 illustrates only one possible configuration of a computing device wherein systems and methods for mapping data to a tree structure may be performed. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. It should be noted that a computer-readable medium may be non-transitory and tangible. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method(s). The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for mapping graph data into a tree structure, comprising:
   a processor;
   memory in electronic communication with the processor;
   instructions stored in the memory, the instructions being executable to:
      obtain graph data;
      map the graph data into a tree structure, wherein mapping the graph data to a tree structure comprises:
         determining a hierarchy;
         generating nodes based on one or more objects and one or more attributes; and
         generating a node relationship based on the hierarchy and a relationship between at least one object and at least one attribute to create a tree structure, wherein the nodes generated comprise software product nodes and categories of software products;
      apply the tree structure to a user interface;
      display the user interface; and
      perform an operation using the tree structure, wherein performing the operation using the tree structure comprises filtering based on software product usage using the tree structure.

2. The computing device of claim 1, wherein determining a hierarchy is based on tiered categories.

3. The computing device of claim 1, wherein performing the operation using the tree structure comprises navigating the tree structure.

4. The computing device of claim 1, wherein the instructions are further executable to obtain one or more custom attributes.

5. The computing device of claim 1, wherein relationships in the graph data are transitive.

6. The computing device of claim 1, wherein an object in the graph data is mapped to one or more leaf nodes in the tree structure.

7. The computing device of claim 1, wherein an object or an attribute in the graph data is mapped to one or more nodes in the tree structure.

8. A method for mapping graph data into a tree structure, comprising:
   obtaining graph data;
   mapping, on a computing device, the graph data into a tree structure, wherein mapping the graph data to a tree structure comprises:
      determining a hierarchy;
      generating nodes based on one or more objects and one or more attributes; and
      generating a node relationship based on the hierarchy and a relationship between at least one object and at least one attribute to create a tree structure, wherein the nodes generated comprise software product nodes and categories of software products;
   applying, on the computing device, the tree structure to a user interface;
   displaying the user interface; and
   performing an operation using the tree structure, wherein performing the operation using the tree structure comprises filtering based on software product usage using the tree structure.

9. The method of claim 8, wherein determining a hierarchy is based on tiered categories.

10. The method of claim 8, wherein performing the operation using the tree structure comprises navigating the tree structure.

11. The method of claim 8, further comprising obtaining one or more custom attributes.

12. The method of claim 8, wherein relationships in the graph data are transitive.

13. The method of claim 8, wherein an object in the graph data is mapped to one or more leaf nodes in the tree structure.

14. The method of claim 8, wherein an object or an attribute in the graph data is mapped to one or more nodes in the tree structure.

15. A non-transitory, tangible computer-readable medium for mapping graph data into a tree structure comprising executable instructions for:
- obtaining graph data;
- mapping the graph data into a tree structure, wherein mapping the graph data to a tree structure comprises:
  - determining a hierarchy;
  - generating nodes based on one or more objects and one or more attributes; and
  - generating a node relationship based on the hierarchy and a relationship between at least one object and at least one attribute to create a tree structure, wherein the nodes generated comprise software product nodes and categories of software products;
- applying the tree structure to a user interface;
- displaying the user interface; and
- performing an operation using the tree structure, wherein performing the operation using the tree structure comprises filtering based on software product usage using the tree structure.

\* \* \* \* \*